US012345799B2

(12) United States Patent
Ji et al.

(10) Patent No.: US 12,345,799 B2
(45) Date of Patent: Jul. 1, 2025

(54) REPORTED MOBILE DEVICE LOCATION ASSESSMENT

(71) Applicant: QUALCOMM Incorporated, San Diego, CA (US)

(72) Inventors: Lianghai Ji, San Diego, CA (US); Weimin Duan, San Diego, CA (US); Jun Ma, San Diego, CA (US); Huilin Xu, Temecula, CA (US); Liangping Ma, San Diego, CA (US); Mohamad Sayed Hassan, Paris (FR); Qiang Wu, San Diego, CA (US); Mehmet Izzet Gurelli, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/876,805

(22) Filed: Jul. 29, 2022

(65) Prior Publication Data

US 2024/0036185 A1 Feb. 1, 2024

(51) Int. Cl.
*G01S 13/524* (2006.01)
*G01S 5/00* (2006.01)
(Continued)

(52) U.S. Cl.
CPC .......... *G01S 13/524* (2013.01); *G01S 5/0246* (2020.05); *G01S 13/12* (2013.01); *G01S 19/38* (2013.01);
(Continued)

(58) Field of Classification Search
CPC ...... G01S 13/524; G01S 13/12; G01S 5/0246; G01S 1/68; G01S 5/0027; G01S 5/0036;
(Continued)

(56) References Cited

U.S. PATENT DOCUMENTS

2016/0091608 A1  3/2016  Robinson et al.
2017/0102466 A1*  4/2017  Petkus ................. G01S 5/0249
(Continued)

FOREIGN PATENT DOCUMENTS

WO     1998014796      4/1998
WO   WO-2001007929 A1   2/2001
(Continued)

OTHER PUBLICATIONS

Wang, Wenjin, et al. "Location-based timing advance estimation for 5G integrated LEO satellite communications." IEEE Transactions on Vehicular Technology 70.6 (2021): 6002-6017. (Year: 2021).*

(Continued)

*Primary Examiner* — Vladimir Magloire
*Assistant Examiner* — Remash R Guyah
(74) *Attorney, Agent, or Firm* — SUNSTEIN LLP/Qualcomm

(57) ABSTRACT

A method of assessing a reported UE location includes: receiving, at a network entity, the reported UE location; obtaining, at the network entity, a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and providing, by the network entity, a UE location assessment indication based on the first signal frequency difference and a second difference between an expected frequency of the first signal at the reported UE location and an expected frequency of the second signal at the reported UE location.

30 Claims, 11 Drawing Sheets

(51) Int. Cl.
*G01S 5/02* (2010.01)
*G01S 13/12* (2006.01)
*G01S 19/38* (2010.01)
*H04W 64/00* (2009.01)

(52) U.S. Cl.
CPC ......... *H04W 64/003* (2013.01); *G01S 5/0027* (2013.01)

(58) Field of Classification Search
CPC ...... G01S 5/0244; G01S 1/042; G01S 1/0428; G01S 5/0205; G01S 5/0226; G01S 19/38; G01S 5/02; G01S 1/02; G01S 19/10; G01S 19/11; G01S 19/21; G01S 19/215; G01S 19/48; G01S 19/396; G01S 5/0249; G01S 19/46; G01S 2205/04; G01S 5/06; G01S 19/37; G01S 19/485; G01S 19/49; H04W 64/003; H04W 12/122; H04L 63/1425; H04L 63/1466
USPC .................................................. 342/463, 357
See application file for complete search history.

(56) References Cited

U.S. PATENT DOCUMENTS

| | | | |
|---|---|---|---|
| 2018/0329013 A1* | 11/2018 | Robinson | G01S 19/10 |
| 2021/0144539 A1* | 5/2021 | Edge | H04B 7/18526 |
| 2021/0333411 A1 | 10/2021 | Gum et al. | |
| 2022/0046444 A1* | 2/2022 | Manolakos | H04L 5/0091 |
| 2023/0413203 A1* | 12/2023 | Ryu | H04W 56/0045 |

FOREIGN PATENT DOCUMENTS

| | | | |
|---|---|---|---|
| WO | 2019079798 A1 | 4/2019 | |
| WO | WO-2022133951 A1 * | 6/2022 | H04L 27/0006 |

OTHER PUBLICATIONS

International Search Report and Written Opinion—PCT/US2023/023525—ISA/EPO—Sep. 15, 2023.

* cited by examiner

REPORTED MOBILE DEVICE LOCATION ASSESSMENT

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example method of assessing a reported UE location includes: receiving, at a network entity, the reported UE location; obtaining, at the network entity, a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and providing, by the network entity, a UE location assessment indication based on the first signal frequency difference and based on a second signal frequency difference, that is a second difference between an expected frequency of the first signal at the reported UE location and an expected frequency of the second signal at the reported UE location.

An example network entity includes: a memory; and a processor communicatively coupled to the memory and configured to: receive a reported UE location; obtain a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and provide a UE location assessment indication based on the first signal frequency difference and based on a second signal frequency difference, that is a second difference between an expected frequency of the first signal at the reported UE location and an expected frequency of the second signal at the reported UE location.

Another example network entity includes: means for receiving a reported UE location; means for obtaining a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and means for providing a UE location assessment indication based on the first signal frequency difference and based on a second signal frequency difference, that is a second difference between an expected frequency of the first signal at the reported UE location and an expected frequency of the second signal at the reported UE location.

An example non-transitory, processor-readable storage medium includes processor-readable instructions to cause one or more processors of a network entity to: receive a reported UE location; obtain a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and provide a UE location assessment indication based on the first signal frequency difference and based on a second signal frequency difference, that is a second difference between an expected frequency of the first signal at the reported UE location and an expected frequency of the second signal at the reported UE location.

An example UE includes: a memory; a transceiver; and a processor communicatively coupled to the memory and the transceiver and configured to: receive, via the transceiver, a first received signal having a first received signal frequency and corresponding to a first transmit signal of a first transmit frequency transmitted from a first non-terrestrial-network node; receive, via the transceiver, a second received signal having a second received signal frequency and corresponding to a second transmit signal of a second transmit frequency transmitted from a second non-terrestrial-network node that is separate from the first non-terrestrial-network node; and transmit, via the transceiver to a network entity, a signal frequency difference indicating a difference between the first received signal frequency and the second received signal frequency.

An example method of reporting received-signal frequency difference includes: receiving, at a UE, a first received signal having a first received signal frequency and corresponding to a first transmit signal of a first transmit frequency transmitted from a first non-terrestrial-network node; receiving, at the UE, a second received signal having a second received signal frequency and corresponding to a second transmit signal of a second transmit frequency transmitted from a second non-terrestrial-network node that is separate from the first non-terrestrial-network node; and transmitting, from the UE to a network entity, a signal frequency difference indicating a difference between the first received signal frequency and the second received signal frequency.

Another example UE includes: means for receiving a first received signal having a first received signal frequency and corresponding to a first transmit signal of a first transmit frequency transmitted from a first non-terrestrial-network node; means for receiving a second received signal having a second received signal frequency and corresponding to a second transmit signal of a second transmit frequency transmitted from a second non-terrestrial-network node that is separate from the first non-terrestrial-network node; and means for transmitting, to a network entity, a signal frequency difference indicating a difference between the first received signal frequency and the second received signal frequency.

Another example non-transitory, processor-readable storage medium includes processor-readable instructions to cause one or more processors of a UE to: receive a first received signal having a first received signal frequency and corresponding to a first transmit signal of a first transmit frequency transmitted from a first non-terrestrial-network node; receive a second received signal having a second received signal frequency and corresponding to a second transmit signal of a second transmit frequency transmitted from a second non-terrestrial-network node that is separate from the first non-terrestrial-network node; and transmit, to a network entity, a signal frequency difference indicating a difference between the first received signal frequency and the second received signal frequency.

DETAILED DESCRIPTION

Figure 1:
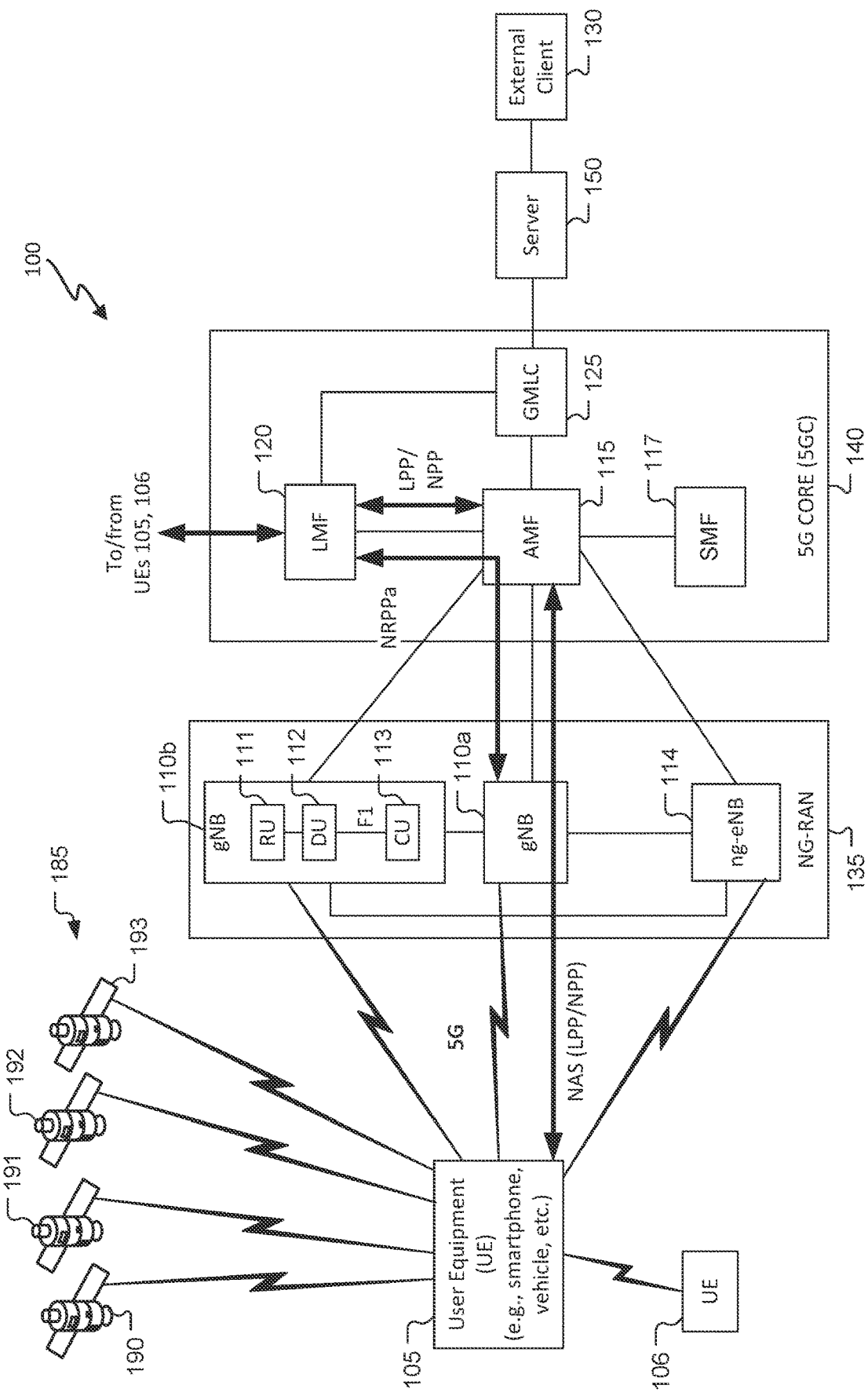
FIG. 1 is a simplified diagram of an example wireless communications system.

Techniques are discussed herein for determining whether a reported mobile device location is accurate. For example, multiple non-terrestrial network (NTN) nodes transmit signals that are received by a mobile device. The mobile device measures the carrier frequency of each of the received signals. The mobile device reports a difference between the carrier frequencies of the received signals, and reports a location of the mobile device. A network entity receives the reported mobile device location and the reported carrier frequency difference from the mobile device. The network entity also calculates an expected carrier frequency difference of the signals from the NTN nodes for the reported UE location. The network entity determines whether the reported carrier frequency difference and the calculated expected carrier frequency difference are indicative of the reported mobile device location being accurate (e.g., the actual and expected carrier frequency differences being within a threshold closeness of each other) or inaccurate (e.g., false) (e.g., not being within the threshold closeness of each other). Other implementations than these examples, however, may be used.

Items and/or techniques described herein may provide one or more of the following capabilities, as well as other capabilities not mentioned. Reported mobile device location may be determined to be inaccurate or accurate. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth® A), and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a. 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU III, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU Ill via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS (Synchronization Signals) or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs. WiFi APs, an MME, and an E-SMLC.

As noted, in some embodiments, positioning functionality may be implemented, at least in part, using the directional SS or PRS beams, sent by base stations (such as the gNBs 100a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
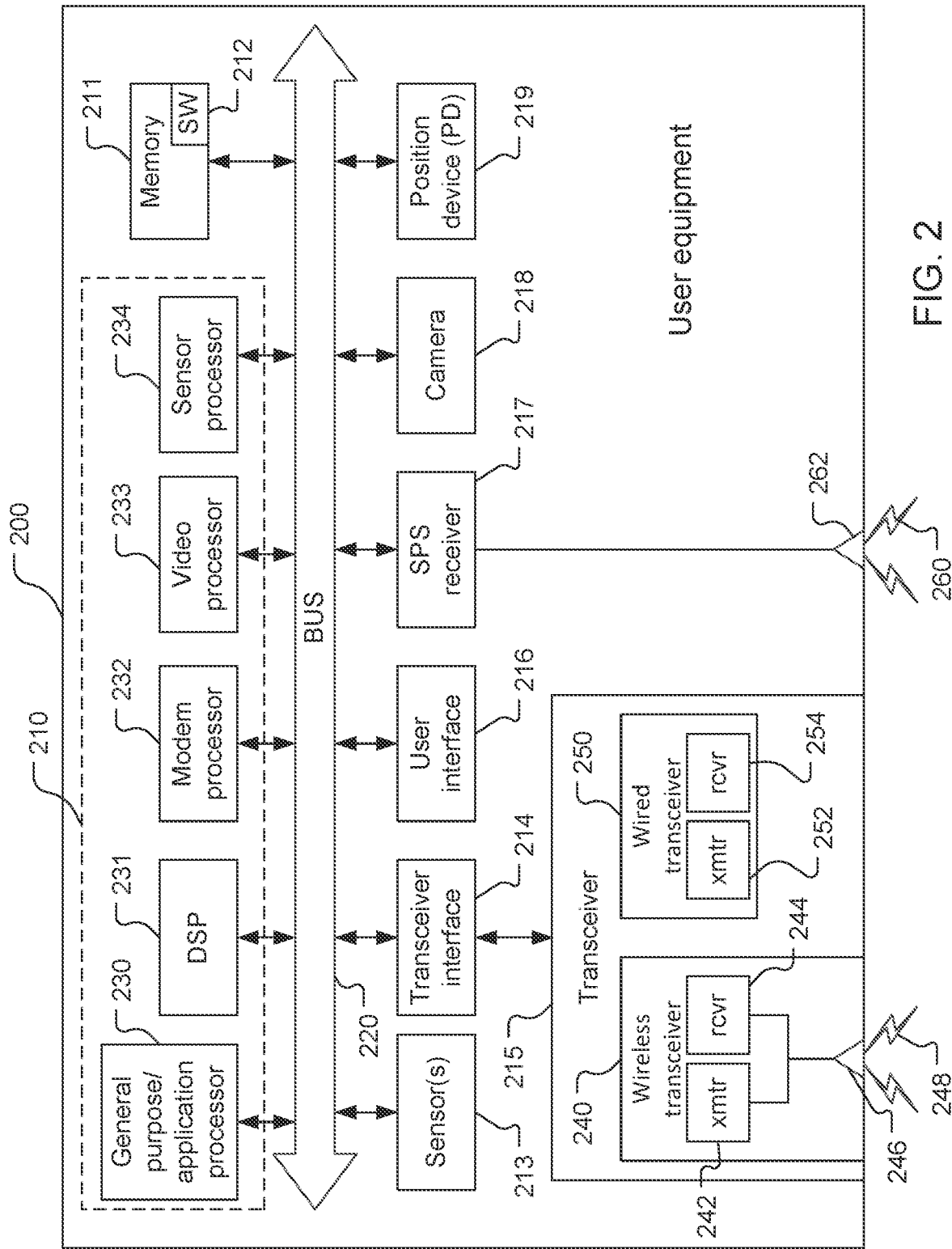
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes. e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (110) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure. e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
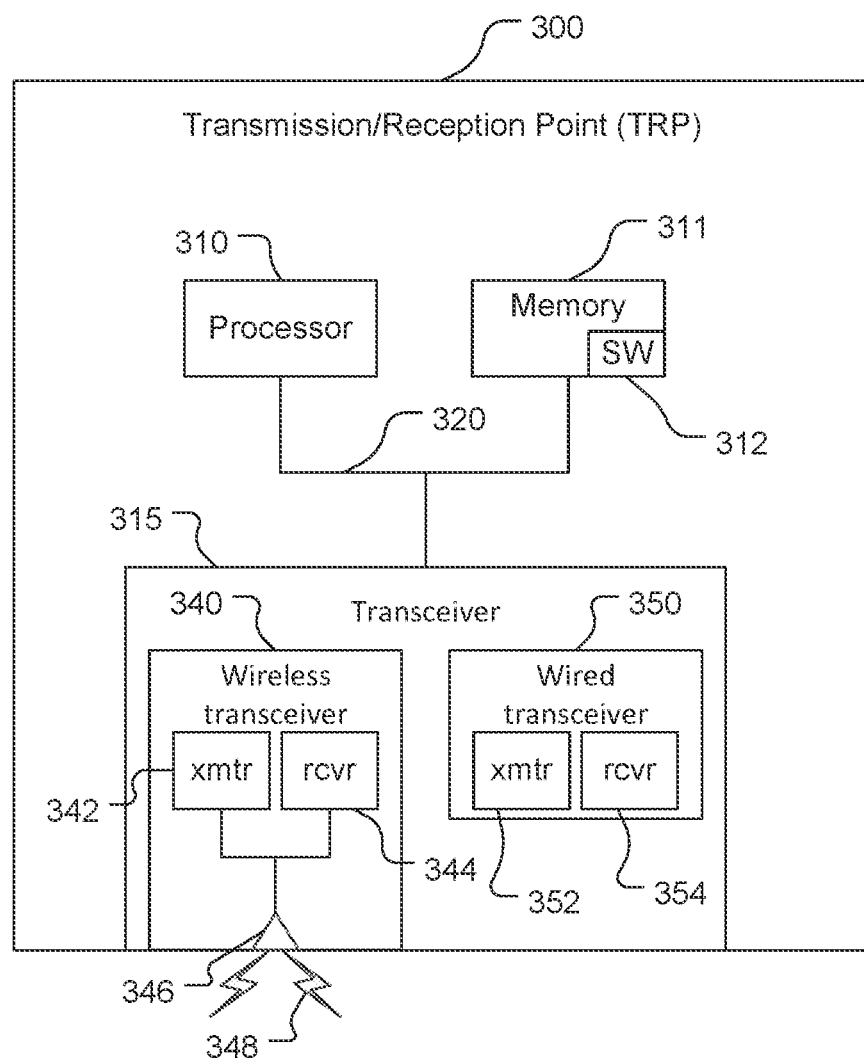
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
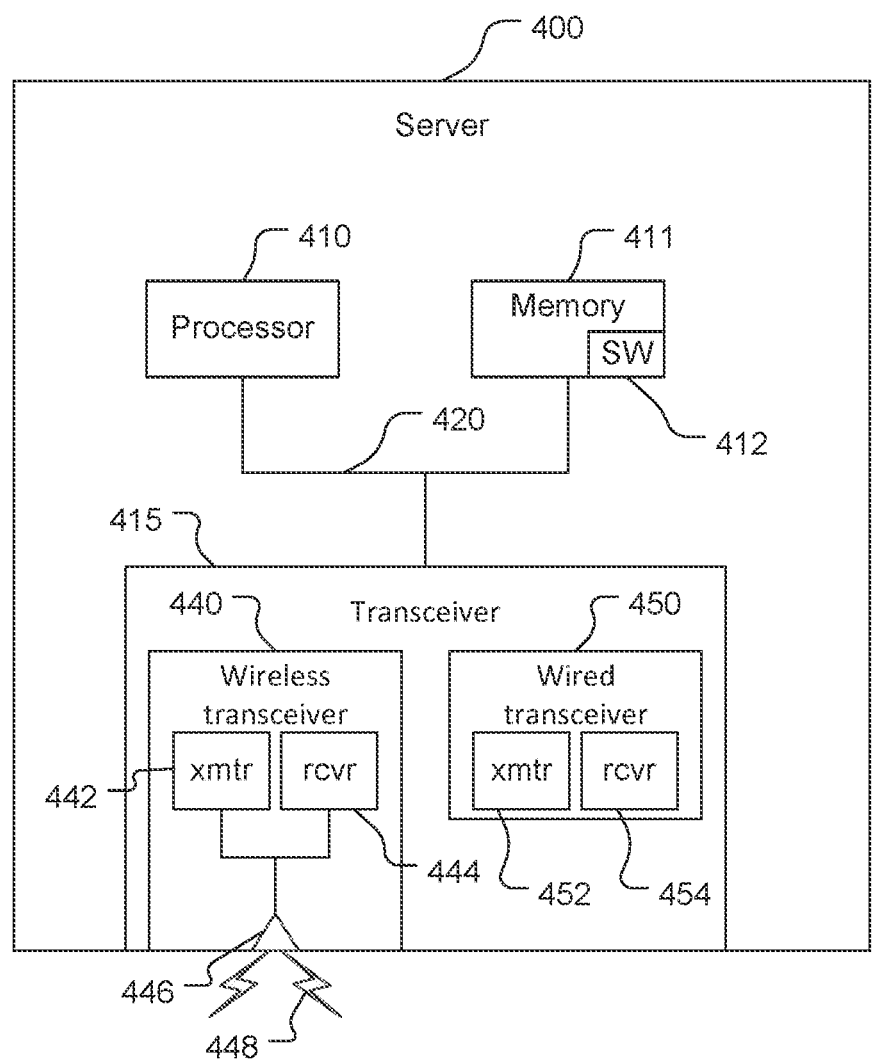
FIG. 4 is a block diagram of components of an example server, various embodiments of which are shown in FIG. 1.

Referring also to FIG. 4, a server 400, of which the LMF 120 may be an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
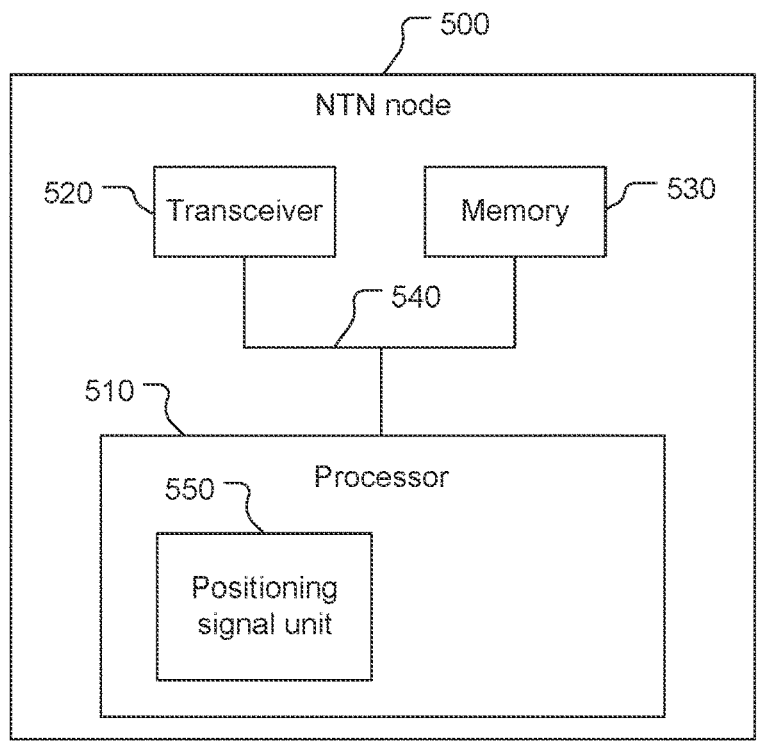
FIG. 5 is a block diagram of an example non-terrestrial-network node.

Referring to FIG. 5, an NTN node 500 (non-terrestrial network node) includes a processor 510, a transceiver 520, and a memory 530 communicatively coupled to each other by a bus 540. The NTN node 500 may include the components shown in FIG. 5, and may include one or more other components. For example, the transceiver 520 may include a wireless transmitter, a wireless receiver, and an antenna, configured for wireless communication with one or more other devices such as a UE. Thus, the NTN node 500 may be similar to the TRP 300, but without including a wired transmitter or a wired receiver (although the NTN node 500 may include such devices). The transceiver 520 is configured to transmit one or more positioning signals (e.g., one or more GNSS signals if the NTN node 500 is part of a satellite, and/or one or more other positioning signals (e.g., with a particular carrier frequency and having a particular pattern)) to a UE. The carrier frequency and/or the pattern (e.g., of binary 0's and 1's) of a positioning signal transmitted by the NTN node 500 may be selected by the processor 510, or indicated by another entity in an instruction received by the transceiver 520. The NTN node 500 may receive a positioning signal, and amplify and forward the received positioning signal such that the NTN node 500 selects neither the carrier frequency nor the pattern of the positioning signal. The NTN node 500 may take a variety of forms or be part of any of a variety of devices such as a satellite, an unoccupied aerial vehicle (UAV), an airplane, etc.

The description herein may refer only to the processor 510 performing a function, but this includes other implementations such as where the processor 510 executes software (stored in the memory 530) and/or firmware. The description herein may refer to the NTN node 500 performing a function as shorthand for one or more appropriate components (e.g., the processor 510 and the memory 530) of the NTN node 500 performing the function. The processor 510 (possibly in conjunction with the memory 530 and, as appropriate, the transceiver 520) may include a positioning signal unit 550. The positioning signal unit 550 is discussed further below, and the description may refer to the processor 510 generally, or the NTN node 500 generally, as performing any of the functions of the positioning signal unit 550, with the NTN node 500 being configured to perform the functions.

Figure 6:
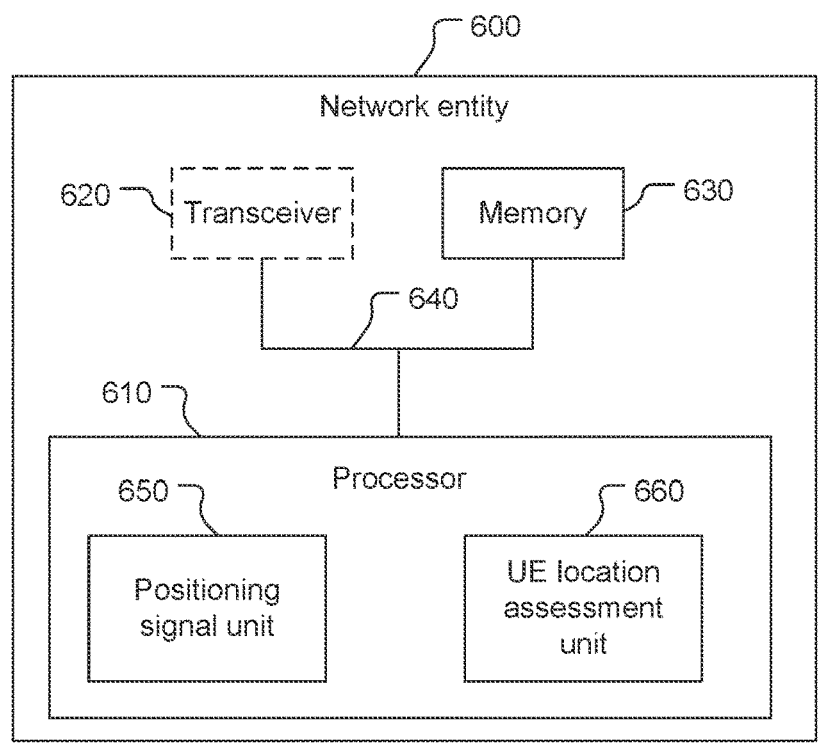
FIG. 6 is a block diagram of an example network entity.

Referring to FIG. 6, a network entity 600 includes a processor 610 and a memory 630 communicatively coupled to each other by a bus 640. The network entity 600 may include a transceiver 620 communicatively coupled to the processor 610 and the memory 630 by the bus 640. The network entity 600 may include the components shown in FIG. 6, and may include one or more other components such as one or more other components. For example, the transceiver 620 may include one or more of the components of the transceiver 415, e.g., the antenna 446 and the wireless transmitter 442 and/or the wireless receiver 444. Also or alternatively, the transceiver 620 may include the wired transmitter 452 and/or the wired receiver 454. The memory 630 may include software with processor-readable instructions configured to cause the processor 610 to perform functions. The network entity 600 may be a standalone device, or may be part of or integrated with another device such as the NTN node 500. The network entity 600 may be part of an NTN or a TN (terrestrial network) and in either case may be configured to communicate with an NTN and/or a TN. The network entity 600 may be partially in each of two or more devices, e.g., partially in an NTN node and partially in a TN node. The network entity 600 may implement an LMF and/or other functionality.

The description herein may refer only to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a positioning signal unit 650 and a UE location assessment unit 660. The positioning signal unit 650 and the UE location assessment unit 660 are discussed further below, and the description may refer to the processor 610 generally, or the network entity 600 generally, as performing any of the functions of the positioning signal unit 650 and/or the UE location assessment unit 660, with the network entity 600 being configured to perform the functions.

Figure 7:
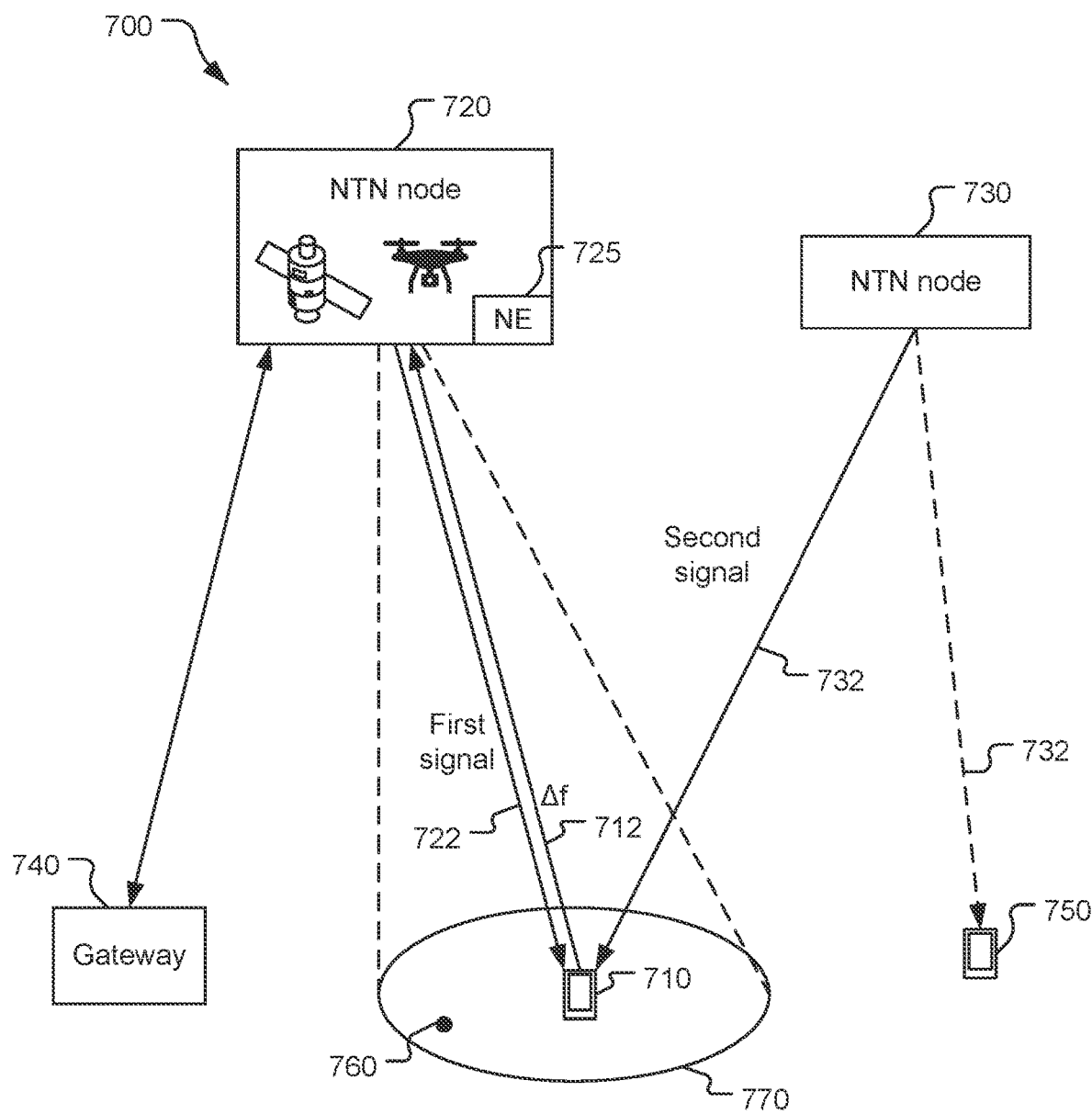
FIG. 7 is a diagram of an example wireless communication environment.

Referring to FIG. 7, with further reference to FIGS. 1-6, a wireless communication environment 700 includes a UE 710, NTN nodes 720, 730, a gateway 740, and possibly another UE 750. The UE 710 may be an example of the UE 200 (which may include one or more components not shown in FIG. 2), or may include less than all of the components of the UE 200 (but may contain one or more other components not shown in FIG. 2). The UE 710 may be referred to as a target UE (i.e., a UE whose location is desired to be determined and/or assessed (e.g., determined to be valid (verified) or invalid (inaccurate)). With an NTN, e.g., including the NTN nodes 720, 730, the UE 710 may communicate with a TN via an NTN node such as the NTN node 720 which, in this example, is a serving node for the UE 710, with the NTN node 720 communicating with the TN via the gateway 740. The UE 710 may communicate with the TN via the NTN node 720, for example, when the UE 710 is unable to communicate directly with a TRP of the TN, e.g., when the UE 710 is in a rural area. Each of the NTN nodes 720, 730 may be an example of the NTN node 500.

The UE 710 may be configured to determine a location of the UE, i.e., the UE location, and report the UE location to a network, e.g., the serving NTN node, which in this example is the NTN node 720, and/or the TN via the NTN node 720. For example, the UE 710 may be configured to determine the UE location using an SPS receiver (e.g., the SPS receiver 217). The UE 710 may report the UE location to a service provider or other entity (e.g., TN entity) such as a law enforcement entity. The UE 710 may report the UE location voluntarily, in response to a request, and/or per a requirement.

The UE 710 may, however, report a false UE location (e.g., per instruction of a user of the UE 710, e.g., to deceive law enforcement and/or another entity receiving the reported UE location). For example, instead of reporting the actual, genuine UE location of the UE 710, the UE 710 may report a false location 760 as though the false location 760 was the actual location of the UE 710. The false location 760 may be within a beam footprint 770 (e.g., a satellite beam footprint) of the NTN node 720, and the beam footprint 770 may span tens or hundreds of kilometers (e.g., if the NTN node 720 is a satellite), which may be too large to by itself verify a reported UE location. That is, having the UE 710 be within the beam footprint 770 may not be sufficient to verify that a reported UE location within the beam footprint is accurate (to a desired degree of accuracy).

Techniques discussed herein, however, can help (a network) assess whether a reported UE location is the actual UE location (or at least within a threshold accuracy of the actual UE location). One or more techniques discussed herein may be used with one or more other techniques to help determine whether a reported UE location is an accurate UE location.

As shown in FIG. 7, the NTN node 720 can send a first signal 722 to the UE 710, with the first signal 722 having a transmit carrier frequency of X Hz. The UE 710 (e.g., the processor 210) can measure the first signal 722 and determine a received carrier frequency of the first signal 722. The received carrier frequency of the first signal 722 may be different from the transmit carrier frequency of the first signal 722 due to a Doppler shift of the first signal 722 due to relative motion between the NTN node 720 and the UE 710 (e.g., due to motion of the NTN node 720 relative to Earth and/or motion of the UE 710 relative to Earth). The carrier frequency of the first signal may be different in different directions from the NTN node 720 due to motion of the NTN node 720 (due to different Doppler shifts in the different directions). The UE 710 may have knowledge of the motion of the NTN node 720 (e.g., based on satellite ephemeris data). Knowledge of relative motion of the UE 710 and the NTN node 720 (e.g., based on satellite ephemeris data), the UE location, and the received carrier frequency may be used (e.g., by the UE 710) to derive a reference frequency and the UE 710 may use the reference frequency to calibrate an oscillator of the UE 710. For example, the NTN node 720 may send an SSB (Synchronization Signal Block) signal to the UE 710 and the UE 710 may use the SSB and a calculated Doppler shift of the SSB to calibrate an oscillator of the UE 710. Motion of the UE 710 relative to Earth may also be used to determine the Doppler shift, but the UE motion relative to Earth may affect the UE motion relative to an NTN node insignificantly compared to motion of the NTN node (e.g., a satellite) relative to Earth. Thus, UE motion relative to Earth may or may not be considered when determining the Doppler shift due to the relative motion of UE and NTN node.

The NTN node 730 (e.g., the positioning signal unit 550) can send a second signal 732 to the UE 710, with the second signal 732 having a transmit carrier frequency of Y Hz. The UE 710 (e.g., the processor 210) can measure the second signal 732 and determine a received carrier frequency of the second signal 732. As with the first signal 722, the received carrier frequency of the second signal 732 may be different from the transmit carrier frequency of the second signal 732 due to a Doppler shift of the second signal 732 due to relative motion between the NTN node 730 and the UE 710 (and due to relative motion of the NTN node 720 and the NTN node 730 if the second signal 732 originated with the NTN node 720, as discussed further below). The NTN node 730 may, for example, be a non-geostationary satellite orbit (NGSO) satellite, which may not be the serving NTN node for the UE 710. The UE 710 should not know the motion information (e.g., satellite ephemeris data) for the NTN node 730 in order to inhibit the UE 710 from being able to calculate and report a false frequency difference that accurately corresponds to a false UE location reported by the UE 710. The NTN node 730 may, however, be the serving node for one or more other UEs such as the UE 750, with the UE 750 knowing the motion information of the NTN node 730, and being able to calibrate an oscillator of the UE 750 based on the second signal 732.

The UE 710 determines and reports the UE location (for the UE 710) and a frequency difference between the received carrier frequency of the first signal 722 and the received carrier frequency of the second signal 732. The UE 710 may, for example, report the UE location as determined by the SPS receiver 217. The UE 710 may also calculate and report a frequency difference signal 712 indicating a reported frequency difference ($\Delta f$) between the received carrier frequency of the first signal 722 and the received carrier frequency of the second signal 732. This reported frequency difference may, for example, be the result of subtracting the two received carrier frequencies. As another example, this reported frequency difference may be a ratio of the two received frequencies.

A network entity determines whether the reported UE location is accurate based on the reported UE location and the reported frequency difference. The network entity may be disposed in one or more locations, e.g., as shown a network entity 725 disposed in the NTN node 720, or in a TN (e.g., in another device in the TN or as a standalone device in the TN) that communicates with the NTN node 720 via the gateway 740. The network entity, e.g., the UE location assessment unit 660, may use motion information (e.g., satellite ephemeris data) for each of the NTN nodes 720, 730, the reported UE location, and the transmitted carrier frequencies of the signals 722, 732 to calculate an expected frequency difference of the received carrier frequencies. The network entity will know the transmitted carrier frequencies through communication with the NTN nodes 720, 730, including possibly instructing one or more of the NTN nodes 720, 730 which frequency to use as a respective transmit carrier frequency. The network entity, e.g., the UE location assessment unit 660, determines whether the reported UE location is accurate or not based on whether the reported frequency difference is within a threshold closeness of the expected frequency difference determined by the network entity. The threshold closeness may, for example, be a frequency magnitude difference, or a percentage (e.g., +/−10%), or a ratio threshold (e.g., +/−0.1), although another other form of a threshold may be used.

Figure 8:
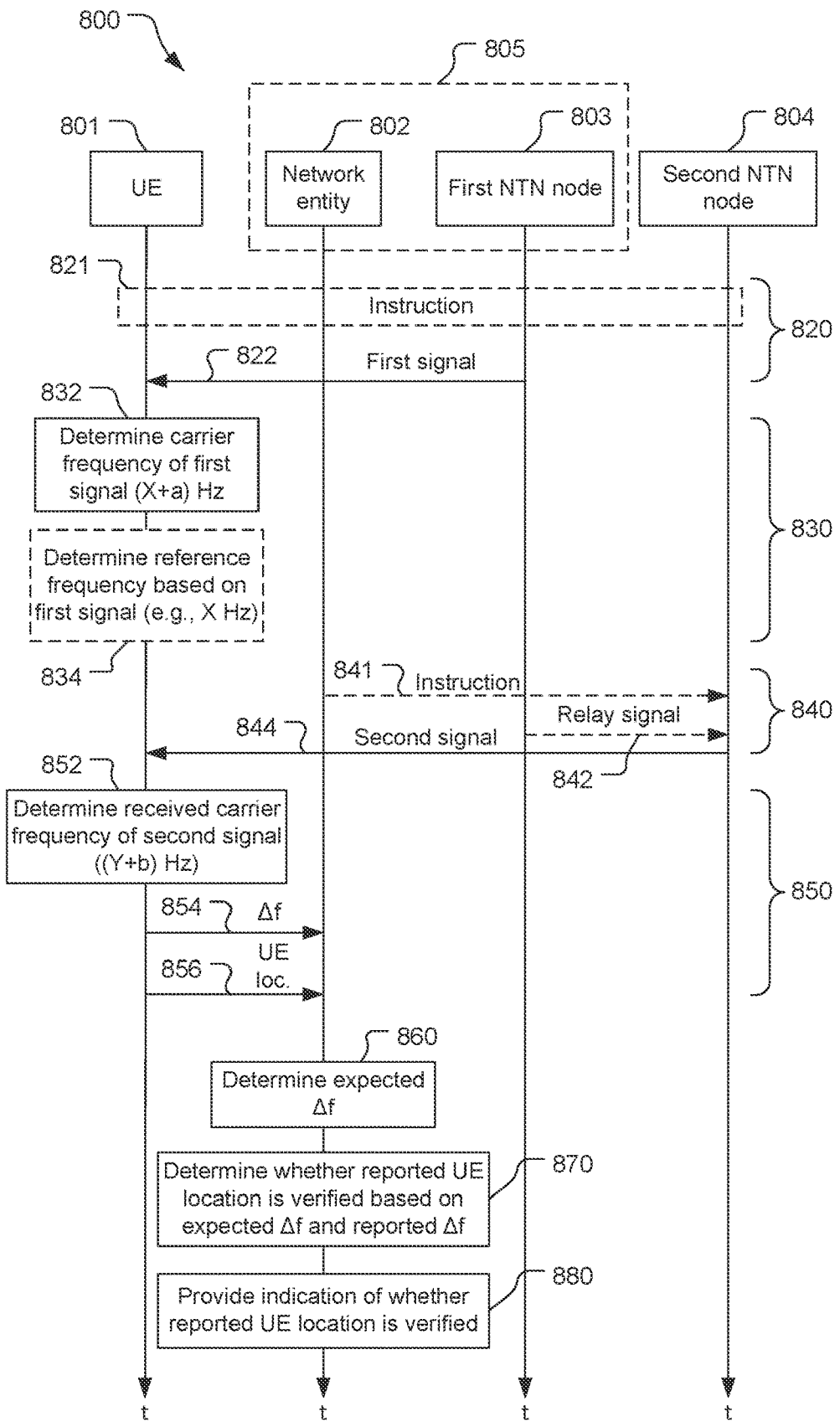
FIG. 8 is a signaling and process flow diagram for reported mobile device location assessment.

Referring to FIG. 8, with further reference to FIGS. 1-7, a signaling and process flow 800 for reported UE location assessment for a UE 801 includes the stages shown. The flow 800 is an example of interaction between the UE 801, a network entity 802, a first NTN node 803, and a second NTN node 804, as stages may be added, rearranged, and/or removed. The UE 801 may be an example of the UE 200 (which may include one or more components not shown in FIG. 2), or may include less than all of the components of the UE 200 (but may contain one or more other components not shown in FIG. 2). The first NTN node 803 and the second NTN node 804 may each be an example of the NTN node 500. The network entity 802 is an example of the network entity 600. The first NTN node 803 and the network entity 802 may, for example, be disposed in a single physical device 805, e.g., a satellite or other NTN device (e.g., an airplane, a UAV, etc.), which may help reduce or avoid latency in reported UE location assessment (e.g., due to information transmission to a terrestrial network, e.g., for one or more calculations discussed herein). As another example, a portion of the network entity 802 may be disposed in a single physical device with the first NTN node 803 and one or more other portions of the network entity 802 disposed elsewhere, e.g., in one or more terrestrial-based devices. As another example, the network entity 802 may be disposed in one or more terrestrial-based devices.

At stage 820, the first NTN node 803 transmits a first signal 822 to the UE 801. The first signal 822 may be a positioning signal with a modulation sequence (of binary 0's and 1's) and a carrier frequency. The first NTN node 803 transmits the first signal 822 with a transmit carrier frequency of X Hz. The received carrier frequency of the first signal 822 may vary based on direction from the first NTN node 803 and motion of the first NTN node 803 relative to the UE 801. The received carrier frequency of the first signal as received by the UE 801 has a frequency of (X+a) Hz, where aHz are due to the Doppler shift. The first NTN node 803 may transmit an indication of the transmit frequency (X) to the UE 801 in system information and/or dedicated signaling (not shown), and/or the UE 801 may obtain the transmit frequency of the first signal 822 in one or more other ways (e.g., the memory 211 being programmed during manufacture per an industry standard, by receiving an indication of the transmit signal from the TRP 300 when in range of a TN, etc.).

At sub-stage 821, the network entity 802 may send one or more instructions to the first NTN node 803, the second NTN node 804, and/or the UE 801. The network entity 802 may determine the node(s) to be used as the first NTN node 803 and/or the second NTN node 804, and/or the time and/or frequency resources used by the first NTN node 803 and/or the second NTN node 804 for signal transmission. For example, the network entity 600 may send one or more instructions to the first NTN node 803, e.g., in response to selecting the first NTN node 803 to send the first signal 822 or in response to the first NTN node 803 being the serving NTN node for the UE 801. The instruction(s) may indicate a signal configuration including the transmit frequency (and/or one or more other parameters, e.g., modulation sequence) for the first NTN node 803 to use to transmit the first signal 822. The network entity 600 may also or alternatively send one or more instructions to the second NTN node 804, e.g., in response selecting the second NTN node 804 to send the second signal 844. The instruction(s) may indicate the transmit frequency (and/or one or more other parameters, e.g., modulation sequence) for the second NTN node 804 to use to transmit the second signal 844, or information for the second NTN node 804 to receive, amplify, and forward the relay signal 842 as the second signal 844. The network entity 600 may also or alternatively send one or more instructions to the UE 801, e.g., with a measurement gap configuration (e.g., a time window and/or a frequency range) to schedule a measurement gap for the UE 801 to receive and measure the first signal 822 and/or the second signal 844. The measurement gap may ensure that the UE 801 does not transmit a signal during the measurement gap that will significantly impede accurate measurement of the carrier frequency of the first signal 822 and/or the second signal 844. Instructions transmitted at sub-stage 821 may be transmitted to the UE 801 via, for example, an AMF and/or an NG-RAN.

At stage 830, the UE 801 determines the received carrier frequency and may determine a reference frequency based on the received carrier frequency. At sub-stage 832, the UE 801 measures the first signal 822 and determines the received carrier frequency ((X+a) Hz) of the first signal 822. Optionally, at stage 834, the UE 801 may determine a reference frequency, e.g., for calibrating an oscillator of the UE 801. For example, the UE 801 may determine the transmit frequency of the first signal 822 based on the received frequency and a calculated Doppler shift of the first signal 822 (based on knowledge of location and motion of the first NTN node 803, and location (and possibly motion) of the UE 801). The UE 801 may determine the reference frequency, e.g., by removing the Doppler component from the received frequency.

At stage 840, the second NTN node 804 transmits a second signal 844 to the UE 801. The second NTN node 804, e.g., the positioning signal unit 550, may produce the second signal 844 and transmit the second signal 844 via the transceiver 520 to the UE 801. The second NTN node 804 may transmit the second signal 844 with a transmit carrier frequency of Y Hz. The received carrier frequency of the second signal 844 may vary based on direction from the second NTN node 804 and motion of the second NTN node 804 relative to the UE 801. The received carrier frequency of the first signal as received by the UE 801 has a frequency of (Y+b) Hz, where b Hz are due to the Doppler shift. The network entity 802 may send an instruction message 841 to the second NTN node 804 (e.g., in response to selecting the second NTN node 804 to send the second signal 844). The instruction message 841 may indicate the transmit frequency (and/or one or more other parameters. e.g., modulation sequence) for the second NTN node 804 to use to transmit the second signal 844. Alternatively, the instruction message 841 may indicate for the second NTN node 804 to receive and amplify a relay signal 842, and forward the amplified relay signal 842 as the second signal 844. In this case, the first NTN node 803 transmits the relay signal 842 to the second NTN node 804 (e.g., via an inter-satellite link) with a transmit frequency of Y Hz to the second NTN node 804. The received second signal frequency of (Y+b) Hz includes Doppler shift due to the relative motion of the second NTN node 804 and the UE 801, and relative motion of the first NTN node 803 and the second NTN node 804. If the second signal 844 is based on the relay signal 842, then an expected frequency difference between the first signal 822 as received and the second signal 844 as received may be calculated accurately without respective oscillators of the first NTN node 803 and the second NTN node 804 being synchronized and without knowing an offset of these oscillators if the oscillators are not synchronized.

At stage 850, the UE 801 determines the carrier frequency of the second signal 844 as received, and provides UE location and a frequency difference to the network entity 802. At sub-stage 852, the UE 801 measures the second signal 844 as received, which has a carrier frequency of (Y+b) Hz, with b Hz being a Doppler shift due to relative motion of the second NTN node 804 and the UE 801 (and relative motion of the first NTN node 803 and the second NTN node 804 if the second signal 844 is a forwarded version of the relay signal 842). The UE 801 determines (e.g., calculates) a frequency difference $\Delta f$ between the carrier frequency of the first signal 822 as received and the carrier frequency of the second signal 844 as received (e.g., ((X+a)−(Y+b)) Hz). The UE 801 transmits a frequency difference message 854 with the frequency difference to the network entity 802. The UE 801 also transmits a location message 856 with the UE location (e.g., as determined by GNSS and/or other means). The messages 854, 856 may be portions of a single message. One or more of the messages 854, 856 may be transmitted to the network entity via, for example, an AMF from an NG-RAN.

At stage 860, the network entity 802 determines an expected frequency difference between the first signal 822 and the second signal 844 for the UE location reported by the UE 801 in the location message 856. Since the second NTN node 804 is not the serving node for the UE 801, the UE 801 does not know the ephemeris data for the second NTN node 804 and thus cannot calculate the transmit frequency Y from the carrier frequency of the second signal 844 as received. Consequently, the UE 801 cannot calculate the carrier frequency of the second signal 844 at a location chosen by the UE 801 (e.g., a fake location (i.e., not the actual location of the UE 801) to report in the location message 856). To determine the expected frequency difference, the network entity 600 (e.g., the UE location assessment unit 660) calculates the carrier frequency of the first signal 822 for the reported location of the UE 801 contained in the location message 856. The network entity 600 uses knowledge of location and motion of the first NTN node 803 (e.g., ephemeris data), the reported location of the UE 801, the transmit frequency X Hz of the first signal 822, and possibly motion of the UE 801 to calculate the expected carrier frequency of the first signal 822 as received by the UE 801. The network entity 600 also calculates the expected carrier frequency of the second signal 844 as received by the UE 801 using knowledge of location and motion of the second NTN node 804 (e.g., ephemeris data), the reported location of the UE 801, the transmit frequency Y Hz of the second signal 844, and possibly motion of the UE 801. The network entity 600 calculates a difference between the expected carrier frequencies of the signals 822, 844 as received by the UE 801 for the reported location of the UE 801 (e.g., by subtracting one expected frequency from the other, or by determining a ratio of the expected frequencies, etc.).

At stage 870, the network entity 600 determines whether the reported UE location is accurate based on the difference in expected carrier frequencies of the signals 822, 844 and the reported frequency difference of the carrier frequencies of the signals 822, 844 as actually received by the UE 801. The network entity 600, e.g., the UE location assessment unit 660, determines whether the reported frequency difference Δf in the frequency difference message 854 and the expected frequency difference calculated at stage 860 are close (e.g., the same). If the expected difference and actual difference are sufficiently close, e.g., within a threshold (e.g., magnitude threshold, percent threshold, etc.), then the network entity 600 may verify the reported UE location, i.e., conclude that the reported UE location is accurate (i.e., genuine). The network entity 600 may thus determine whether the reported UE location is accurate or inaccurate (false). A threshold for determining whether the actual and expected frequency differences are close may depend on one or more factors. For example, the threshold may depend on one or more location accuracy requirements. The threshold may be less stringent (e.g., larger) than a threshold for verifying UE location reported to a terrestrial network. To determine whether the reported UE location is accurate, the network entity 600 may input the closeness of the calculated and reported frequency differences, and possibly one or more other factors, to an artificial intelligence/machine learning/neural network algorithm that is configured to output an indication of whether the reported UE location is accurate. The artificial intelligence/machine learning/neural network algorithm can adapt and improve the reliability of the location assessment indication over time. The one or more other factors may include, for example, measured received signal power (e.g., RSRP) and/or channel state information (CSI).

At stage 880, the network entity 600 provides an indication of whether the reported UE location was verified. For example, the processor 610 may provide one or more indications internally to the network entity 600 and/or one or more indications externally to the network entity 600. The processor 610 may, for example, provide an internal indication that location verification failed, and the processor 610 may act on the indication, e.g., by disregarding the reported location, by de-weighting the reported location, by noting that the reported location is false, etc.). As another example, the processor 610 may transmit a report to an interested entity (e.g., law enforcement) that the reported location for the UE 801 is false. The network entity 600 may act as a service provider to an entity with an interest in location verification for the UE 801.

Figure 9:
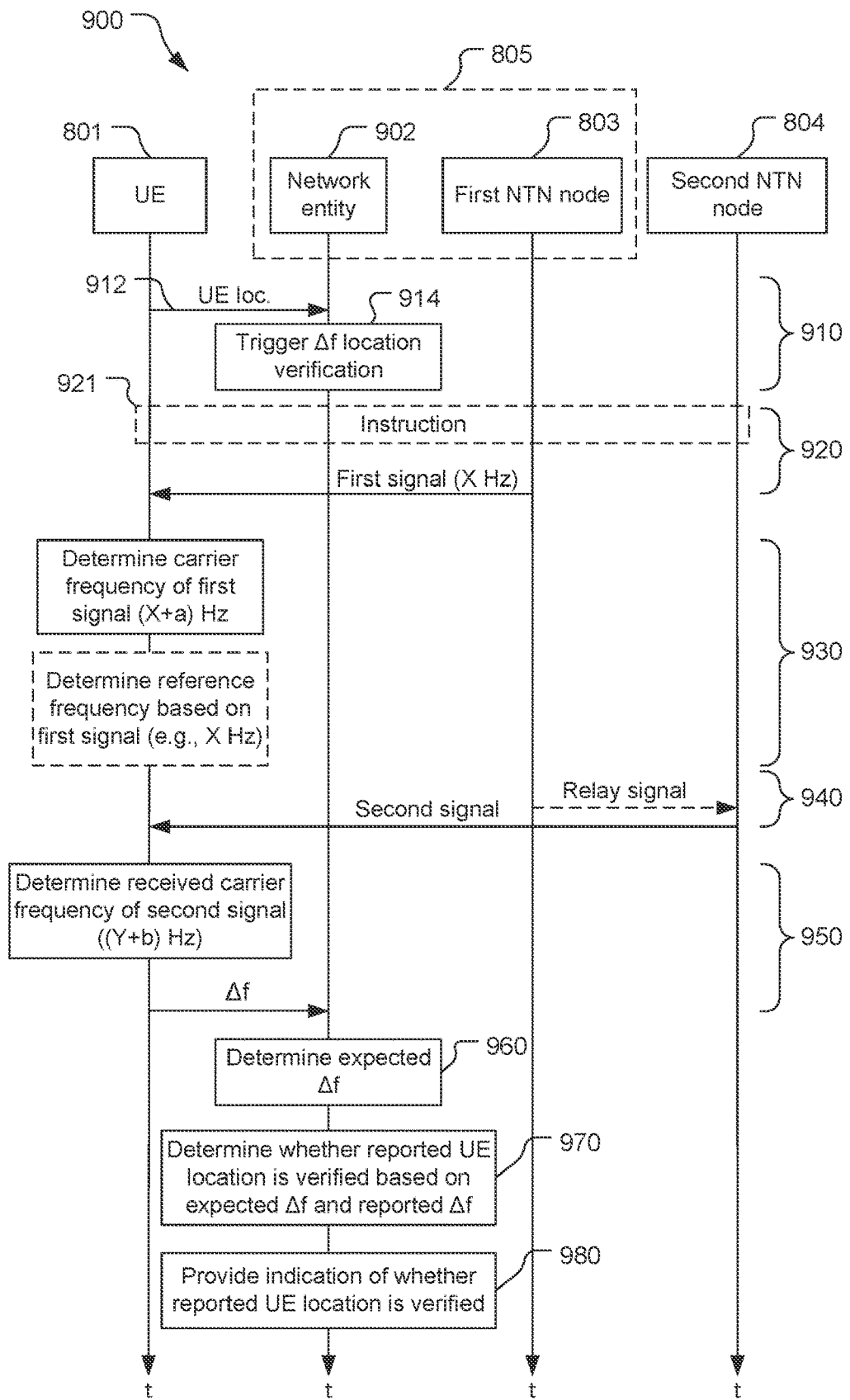
FIG. 9 is another signaling and process flow diagram for reported mobile device location assessment.

Referring to FIG. 9, with further reference to FIGS. 1-8, a signaling and process flow 900 for reported UE location assessment for the UE 801 includes the stages shown. The flow 900 is an example of interaction between the UE 801, a network entity 902, the first NTN node 803, and the second NTN node 804, and stages may be added, rearranged, and/or removed. Stages 920, 930, 940, 960, 970, and 980 are similar to stages 820, 830, 840, 860, 870, and 880 and are thus not further discussed. Stage 950 is similar to stage 850, but the UE 801 reports the location of the UE 801 in stage 910 instead of stage 950 (although the UE 801 could report the location of the UE 801 outside of stage 850 in the flow 800, e.g., earlier than stage 850). The network entity 902 is an example of the network entity 600.

At stage 910, the network entity 902 determines whether to implement the reported UE location assessment using reported and calculated carrier frequency differences. The UE 801 transmits the location of the UE 801 (i.e., an indication of the UE location) in a location message 912 to the network entity 902. At sub-stage 914, the network entity 902 determines whether to trigger UE location assessment according to stages 920, 930, 940, 950, 960, 970, 980 in response to the location message 912. For example, the UE location assessment unit 660 may trigger further stages of the flow 900 based on one or more other techniques implemented by the network entity 600 failing to verify the reported UE location, e.g., with a desired confidence level. Also or alternatively, the UE location assessment unit 660 may trigger further stages of the flow 900 based on a history of the UE 801 reporting false locations, and/or the reported location being unexpected (e.g., being a deviation from a scheduled location), and/or one or more other factors.

At sub-stage 921 of stage 920, configuration information for transmitting and/or receiving (e.g., including measuring) the first signal 822 and/or the second signal 844 may depend on the reported UE location. For example, the network entity 902, e.g., the positioning signal unit, may determine the configuration information based on the reported UE location. For example, a time window for receiving the signals 822, 844 may be based on the reported UE location and the distances between the reported UE location and the nodes 803, 804. Even an inaccurate (e.g., false) reported UE location may not be so far from the accurate UE location to make the calculated time window unusable (e.g., make one or both of the signals 822, 844 arrive at the UE 801 outside of the time window). If one or both of the signals 822, 844 arrive at the UE 801 outside of the time window, then this information may be used to conclude that the reported UE location is false. As another example, the network entity 600 may select which NTN node to be the second NTN node 804, and/or the transmit frequency of the second signal, based on the reported UE location. e.g., to help ensure a sufficient frequency differential of the signals 822, 844 at the reported location for a reliable conclusion to be made at stage 970.

At sub-stage 921, the network entity 600 may instruct the UE 801 to report motion (e.g., velocity (including speed and direction)) of the UE 801. For example, the network entity 600 may determine that relative motion between the UE 801 and one or more of the nodes 803, 804 may be affected enough by motion of the UE 801 relative to Earth to make considering the motion of the UE 801 relative to Earth when calculating the expected frequency difference at stage 960. The network entity 600 may determine that the UE 801 may move along or near a respective direction of propagation of the first signal 822 and/or the second signal 844 and, in response thereto, instruct the UE 801 to report UE motion. For example, if a node is near the horizon relative to the UE 801, then the network entity 600 may instruct the UE 801 to report motion. As another example, if both of the nodes 803, 804 are high in sky relative to the UE 801 (e.g., directly above the UE 801 or nearly so), then the network entity 600 may not instruct the UE 801 to report UE motion, or may even instruct the UE 801 not to report UE motion.

Figure 10:
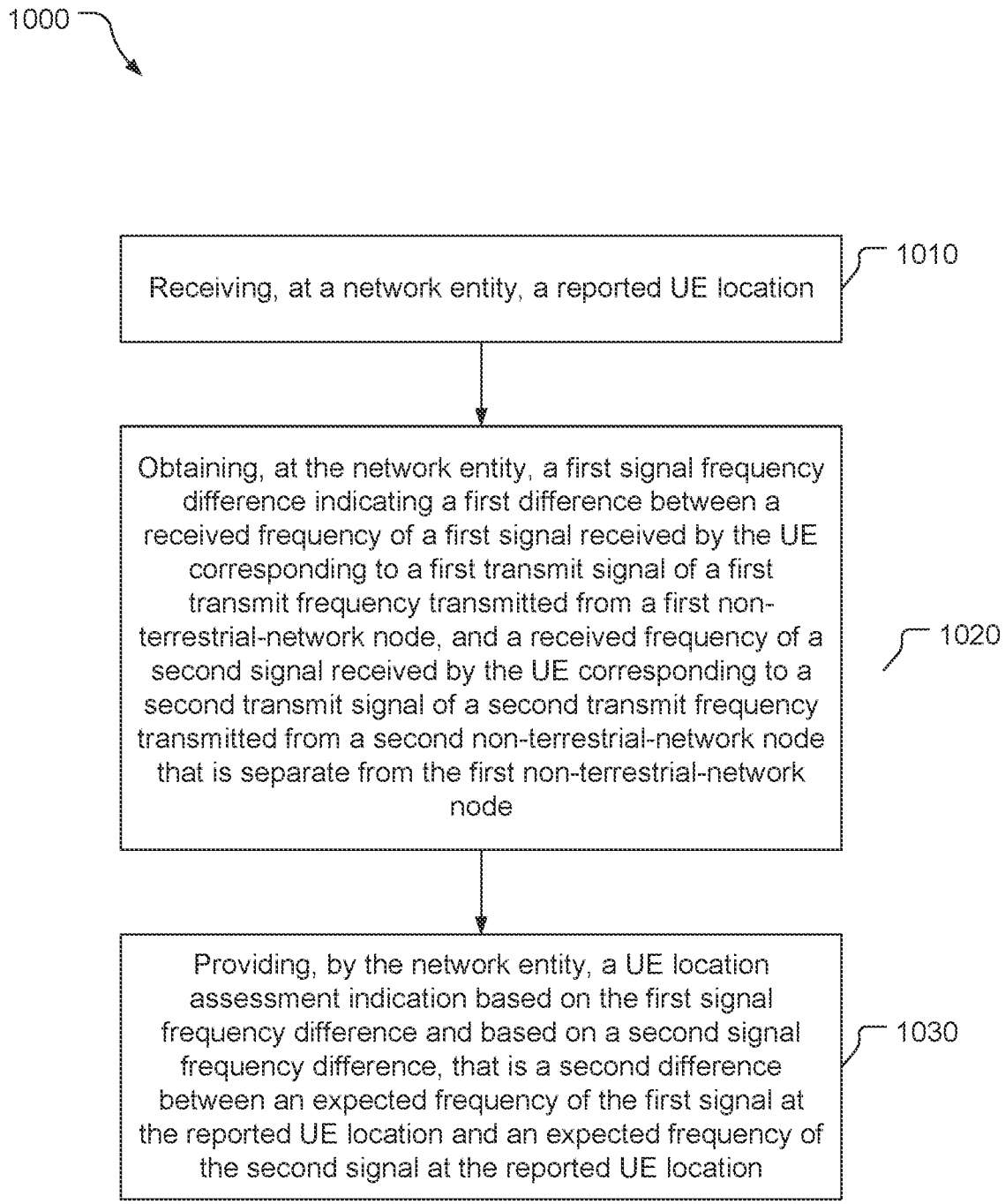
FIG. 10 is a block flow diagram of a method of assessing a reported user equipment location.

Referring to FIG. 10, with further reference to FIGS. 1-9, a method 1000 of assessing a reported UE location includes the stages shown. The method 1000 is, however, an example and not limiting. The method 1000 may be altered, e.g., by having stages added, removed, rearranged, combined, performed concurrently, and/or having single stages split into multiple stages.

At stage 1010, the method 1000 includes receiving, at a network entity, the reported UE location. For example, the network entity 802 receives the reported UE location in the location message 856 or the network entity 902 receives the reported UE location in the location message 912. The processor 610, possibly in combination with the memory 630, possibly in combination with the transceiver 620 (e.g., a wireless receiver and an antenna) may comprise means for receiving the reported UE location.

At stage 1020, the method 1000 includes obtaining, at the network entity, a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node. For example, the processor 610 may receive (e.g., from the UE 801 via the first NTN node 803 or from the UE 801 in the frequency difference message 854 via the transceiver 620) the first signal frequency difference. As another example, the processor 610 may calculate the first signal frequency difference based on received reports of the measured frequency of the first signal 822 and the measured frequency of the second signal 844. The processor 610, possibly in combination with the memory 630, possibly in combination with the transceiver 620 (e.g., a wireless receiver and an antenna) may comprise means for obtaining the first signal frequency difference.

At stage 1030, the method 1000 includes providing, by the network entity, a UE location assessment indication based on the first signal frequency difference and based on a second signal frequency difference, that is a second difference between an expected frequency of the first signal at the reported UE location and an expected frequency of the second signal at the reported UE location. For example, at stage 880 the UE location assessment unit 660 of the network entity 802 (or at stage 980 the UE location assessment unit 660 of the network entity 902) may send an indication of whether the reported UE location was verified, or determined to be inaccurate, to another portion (e.g., an application) of the network entity 600 and/or to an entity external to the network entity 600 (e.g., to an NTN node, where NTN node and the network entity may be portions of the same physical device or may be in separate physical devices). The assessment of reported UE location accuracy is based on actual and estimated frequency differences of the first and second signals 822, 844. The location assessment indication may be provided to any entity with an interest in whether the reported UE location is accurate. The location assessment indication may indicate a failure to verify the reported UE location or successful verification of the reported UE location. An inaccurate reported UE location may, for example, be disregarded in determining a location of the UE, which may improve positioning of the UE 801. As another example, inaccurate reporting of location may be flagged and/or trigger one or more actions, such as law enforcement personally confirming whether a person associated with the UE 801 has violated a geographic restriction. The processor 610, possibly in combination with the memory 630, possibly in combination with the transceiver 620 (e.g., a wireless transmitter and an antenna) may comprise means for providing the location assessment indication.

Implementations of the method 1000 may include one or more of the following features. In an example implementation, the UE location assessment indication is a UE location verification failure indication and is provided based on the first signal frequency difference and the second signal frequency difference differing by more than a threshold. In another example implementation, the method comprises determining the second signal frequency difference in response to the reported UE location being a trigger location, and/or providing the UE location assessment indication is performed in response to the reported UE location being the trigger location. For example, assessment of the reported UE location may be triggered based on the reported UE location, e.g., as discussed above. In another example implementation, the method includes: obtaining, at the network entity, an indication of a velocity of the UE; determining, at the network entity, the expected frequency of the first signal at the reported UE location based on the indication of the velocity of the UE; and determining, at the network entity, the expected frequency of the second signal at the reported UE location based on the indication of the velocity of the UE. For example, the network entity 802 may receive an indication of velocity of the UE 801 and use the velocity to calculate expected carrier frequencies of the signals 822, 844 as received based on the UE velocity and motion of the nodes 803, 804 (and thus the relative motion of the UE 801 to the nodes 803, 804). The processor 610, possibly in combination with the memory 630, possibly in combination with the transceiver 620 (e.g., a wireless receiver and an antenna) may comprise means for obtaining the indication of the velocity of the UE. The processor 610, possibly in combination with the memory 630, may comprise means for determining the expected frequency of the first signal at the reported UE location and means for determining the expected frequency of the second signal at the reported UE location. In another example implementation, the method includes transmitting, from the network entity, a request for the UE to report motion of the UE, wherein the request is transmitted based on anticipated motion of the UE being able to cause a Doppler shift of at least a threshold Doppler shift in at least one of the received frequency of the first signal received by the UE or the received frequency of the second signal received by the UE. For example, the network entity 802 (or the network entity 902) may at sub-stage 821 (or sub-stage 921) instruct the UE 801 to report UE motion. The network entity 802 (or the network entity 902) may instruct the UE 801 based on determining that motion of the UE 801 at the reported UE location may be along or near a direction of propagation from one or more of the NTN nodes 803, 804 such that such motion may have a significant effect on the Doppler shift of one or more of the signals 822, 844.

Also or alternatively, implementations of the method 1000 may include one or more of the following features. In an example implementation, the method includes transmitting, from the network entity, an instruction for the second non-terrestrial-network node to transmit the second transmit signal. For example, the network entity 802 may instruct, at sub-stage 821, the second NTN node 804 to serve as a node for assessment of the validity of the reported UE location by instructing the second NTN node 804 to send the second signal 844. As another example, the network entity 902 may instruct (e.g., at sub-stage 921) the second NTN node 804 to send the second signal to the UE 801. In a further example implementation, the network entity selects the second non-terrestrial-network node, from a plurality of potential network entities, based on the reported UE location. For example, the network entity 902 may select the second NTN node 804 for sending the second signal based on the reported UE location, e.g., with a signal from the second NTN node 804 being likely to provide a desirable received carrier frequency at the reported UE location (e.g., with a significant frequency difference with respect to the first signal).

Also or alternatively, implementations of the method 1000 may include one or more of the following features. In an example implementation, the method includes, at the network entity and based on the reported UE location, at least one of: transmitting a first indication of the first transmit frequency to the first non-terrestrial-network node; or transmitting a second indication of the second transmit frequency to the second non-terrestrial-network node; or transmitting a third indication, of at least one of a time window or a frequency window, for the UE to receive at least one of the first transmit signal or the second transmit signal; or transmitting a fourth indication of a signal sequence for at least one of the first transmit signal or the second transmit signal; or transmitting a measurement gap configuration for the UE to measure at least one of the first transmit signal or the second transmit signal. For example, the network entity 802 (or the network entity 902) may, at sub-stage 821 (or sub-stage 921), instruct the first NTN node 803 which transmit frequency to use for the first signal 822, and/or instruct the second NTN node 804 which transmit frequency to use for the second signal 844, and/or instruct the UE 801 as to a time and/or frequency window and/or a measurement gap for receiving and/or measuring the first signal 822 and/or the second signal 844. Instructing one or both of the transmit frequencies may help ensure successful assessment of reported UE location, e.g., by helping to ensure that the carrier frequency difference at the UE 801 has one or more desired qualities, e.g., at least a threshold difference. Instructing the signal sequence of the first signal 822 and/or the signal sequence of the second signal 844, and/or the time window and/or the frequency window, and/or the measurement gap, may help ensure that the UE 801 is able to receive the first signal 822 and/or the second signal 844 and/or measure the first signal 822 and/or the second signal 844 (e.g., with at least a threshold accuracy). In another example implementation, the UE location assessment indication is provided based on an output of an artificial intelligence algorithm that uses as inputs the second signal frequency difference and at least one of: the first signal frequency difference; or an indication of a received power of at least one of the first signal or the second signal; or an indication of at least one channel state of at least one of a first channel between the first non-terrestrial-network node and the UE or a second channel between the second non-terrestrial-network node and the UE. For example, the UE location assessment unit 660 may implement an artificial intelligence algorithm that determines whether the reported UE location is accurate based on the calculated signal frequency difference and; the reported actual signal frequency difference; an indicated received power of the first signal 822 and/or an indicated received power of the second signal 844; and/or an indication of channel state between the UE 801 and the NTN node 803 and/or between the UE 801 and the second NTN node 804. In another example implementation, the network entity and the first non-terrestrial-network node are both part of a single physical apparatus. For example, the network entity 802 and the first NTN node 803 may be portions of the device 805 (which may be considered to be an NTN node).

Figure 11:
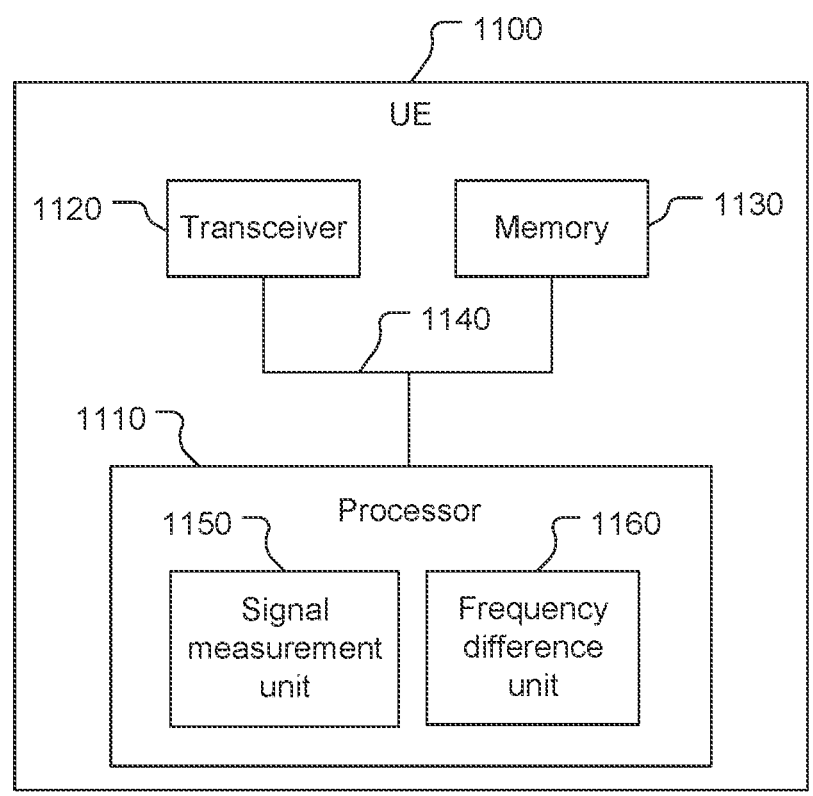
FIG. 11 is a block diagram of an example user equipment.

Referring to FIG. 11, a UE 1100 includes a processor 1110, a transceiver 1120, and a memory 1130 communicatively coupled to each other by a bus 1140. The UE 801 may be an example of the UE 1100. The UE 1100 may include the components shown in FIG. 11, and may include one or more other components such as any of those shown in FIG. 2 such that the UE 200 may be an example of the UE 1100. For example, the processor 1110 may include one or more of the components of the processor 210. The transceiver 1120 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 1120 may include the wired transmitter 252 and/or the wired receiver 254. The memory 1130 may be configured similarly to the memory 211, e.g., including software with processor-readable instructions configured to cause the processor 1110 to perform functions.

The description herein may refer only to the processor 1110 performing a function, but this includes other implementations such as where the processor 1110 executes software (stored in the memory 1130) and/or firmware. The description herein may refer to the UE 1100 performing a function as shorthand for one or more appropriate components (e.g., the processor 1110 and the memory 1130) of the UE 1100 performing the function. The processor 1110 (possibly in conjunction with the memory 1130 and, as appropriate, the transceiver 1120) may include a signal measurement unit 1150 and a frequency difference unit 1160. The signal measurement unit 1150 and the frequency difference unit 1160 are discussed further below, and the description may refer to the processor 1110 generally, or the UE 1100 generally, as performing any of the functions of the signal measurement unit 1150 and the frequency difference unit 1160, with the UE 1100 being configured to perform the functions.

The signal measurement unit 1150 is configured to measure received signals, e.g., to determine received frequencies of the received signals. The signal measurement unit 1150 may, for example, receive configuration information (e.g., signal configuration (e.g., signal timing and/or signal frequency) and/or measurement gap configuration), e.g., at sub-stage 821 or sub-stage 921). The signal measurement unit 1150 may and search for, receive, and possibly measure one or more received signals using the configuration information, e.g., at stage 820, sub-stage 832, and sub-stage 852 or at stage 920, stage 930, and stage 950.

The frequency difference unit 1160 may determine and report frequency difference of received signals. For example, at stage 850 the frequency difference unit 1160 may report the frequency difference message 854 to the network entity 802 and/or at stage 950 the frequency difference unit 1160 may report a frequency difference message to the network entity 902.

Figure 12:
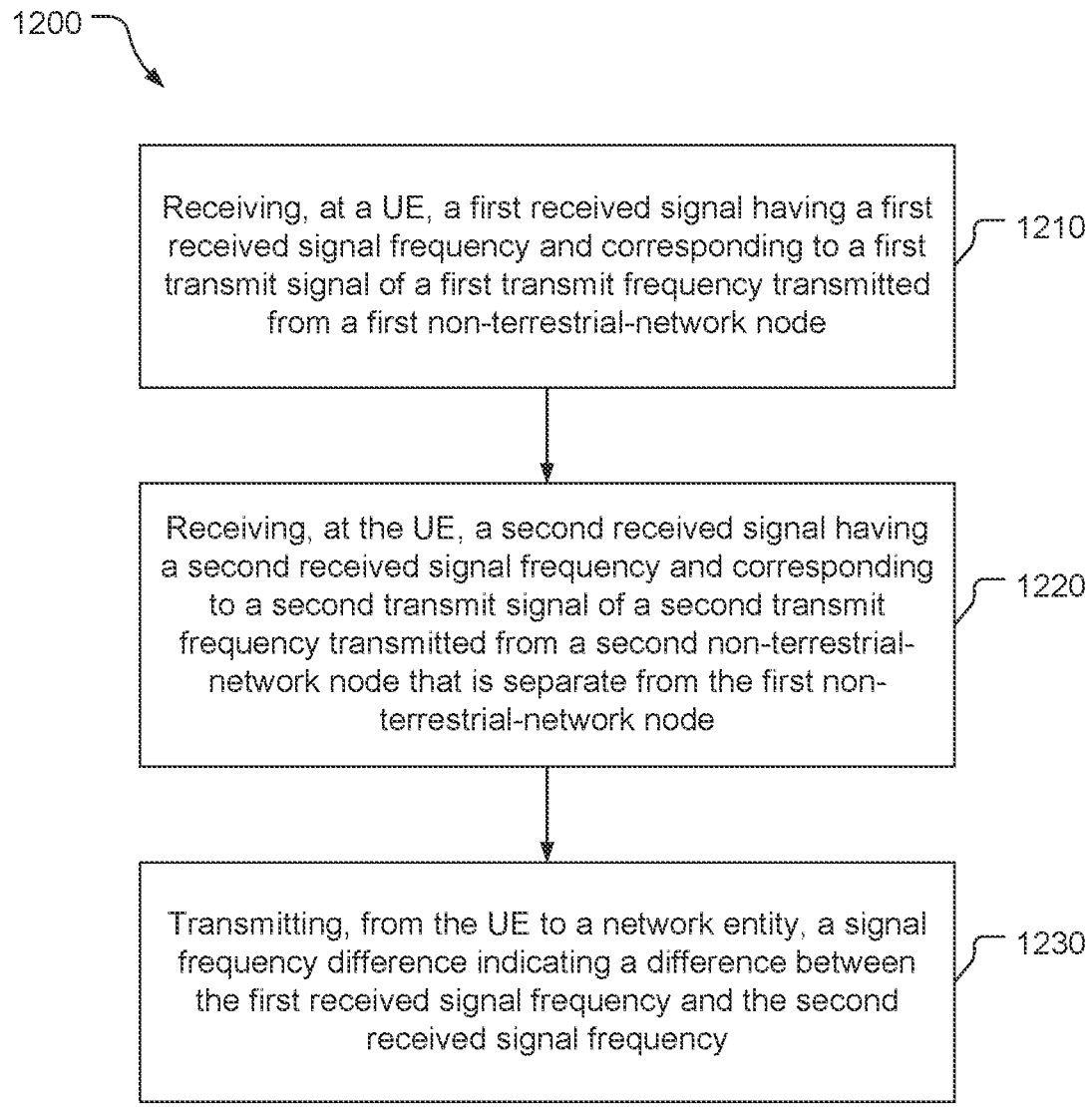
FIG. 12 is a block flow diagram of a method of reporting received-signal frequency difference.

Referring to FIG. 12, with further reference to FIGS. 1-9, a method 1200 of reporting received-signal frequency difference includes the stages shown. The method 1200 is, however, an example and not limiting. The method 1200 may be altered, e.g., by having stages added, removed, rearranged, combined, performed concurrently, and/or having single stages split into multiple stages.

At stage 1210, the method 1200 includes receiving, at a UE, a first received signal having a first received signal frequency and corresponding to a first transmit signal of a first transmit frequency transmitted from a first non-terrestrial-network node. For example, at stage 820 the UE 801 receives the first signal 822 from the first NTN node 803 (or at stage 920 the UE 801 receives the first signal from the first NTN node 803). The processor 1110, possibly in combination with the memory 1130, in combination with the transceiver 1120 (e.g., the wireless receiver 244 and the antenna 246) may comprise means for receiving the first received signal.

At stage 1220, the method 1200 receiving, at the UE, a second received signal having a second received signal frequency and corresponding to a second transmit signal of a second transmit frequency transmitted from a second non-terrestrial-network node that is separate from the first non-terrestrial-network node. For example, at stage 840 the UE 801 receives the second signal 844 from the second NTN node 804 (or at stage 940 the UE 801 receives the second signal from the second NTN node 804). The processor 1110, possibly in combination with the memory 1130, in combination with the transceiver 1120 (e.g., the wireless receiver 244 and the antenna 246) may comprise means for receiving the first received signal.

At stage 1230, the method 1200 includes transmitting, from the UE to a network entity, a signal frequency difference indicating a difference between the first received signal frequency and the second received signal frequency. For example, at stage 850 the UE 801 transmits the frequency difference message 854 to the network entity 802 (or at stage 950 the UE 801 transmits the frequency difference message 854 to the network entity 902). The UE 801 may calculate the frequency difference or may provide the received frequencies to another entity and receive the frequency difference in return. The processor 1110, possibly in combination with the memory 1130, in combination with the transceiver 1120 (e.g., the wireless transmitter 242 and the antenna 246) may comprise means for transmitting the signal frequency difference.

Implementations of the method 1200 may include one or more of the following features. In an example implementation, the method 1200 includes transmitting, to the network entity, an indication of a location of the UE corresponding to the signal frequency difference. For example, the UE 801 may transmit the location message 856 to the network entity 802 or transmit the location message 912 to the network entity 902. The processor 1110, possibly in combination with the memory 1130, in combination with the transceiver 1120 (e.g., the wireless transmitter 242 and the antenna 246) may comprise means for transmitting the indication of the location of the UE. In another example implementation, the method 1200 includes receiving, from the network entity, configuration information for receiving at least one of the first received signal or the second received signal, wherein receiving the first received signal and the second received signal are based on the configuration information. For example, at sub-stage 821 the UE 801 receives configuration information and the UE 801 receives the first signal 822 and/or the second signal 844 using the configuration information. As another example, at sub-stage 921 the UE 801 receives configuration information and the UE 801 receives the first signal at stage 920 and/or the second signal at stage 940 using the configuration information. The processor 1110, possibly in combination with the memory 1130, in combination with the transceiver 1120 (e.g., the wireless receiver 244 and the antenna 246) may comprise means for receiving the configuration information.

Implementation Examples

Implementation examples are provided in the following numbered clauses.

Clause 1. A method of assessing a reported user-equipment (UE) location, the method comprising:
    receiving, at a network entity, the reported UE location;
    obtaining, at the network entity, a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and
    providing, by the network entity, a UE location assessment indication based on the first signal frequency difference and based on a second signal frequency difference, that is a second difference between an expected frequency of the first signal at the reported UE location and an expected frequency of the second signal at the reported UE location.

Clause 2. The method of clause 1, wherein the UE location assessment indication is a UE location verification failure indication and is provided based on the first signal frequency difference and the second signal frequency difference differing by more than a threshold.

Clause 3. The method of clause 1, wherein at least one of:
    the method comprises determining, in response to the reported UE location being a trigger location, the second signal frequency difference; or
    providing the UE location assessment indication is performed in response to the reported UE location being the trigger location.

Clause 4. The method of clause 1, further comprising:
obtaining, at the network entity, an indication of a velocity of the UE;
determining, at the network entity, the expected frequency of the first signal at the reported UE location based on the indication of the velocity of the UE; and
determining, at the network entity, the expected frequency of the second signal at the reported UE location based on the indication of the velocity of the UE.

Clause 5. The method of clause 1, further comprising transmitting, from the network entity, a request for the UE to report motion of the UE, wherein the request is transmitted based on anticipated motion of the UE being able to cause a Doppler shift of at least a threshold Doppler shift in at least one of the received frequency of the first signal received by the UE or the received frequency of the second signal received by the UE.

Clause 6. The method of clause 1, further comprising transmitting, from the network entity, an instruction for the second non-terrestrial-network node to transmit the second transmit signal.

Clause 7. The method of clause 6, wherein the network entity selects the second non-terrestrial-network node, from a plurality of potential network entities, based on the reported UE location.

Clause 8. The method of clause 1, further comprising, at the network entity and based on the reported UE location, at least one of:
transmitting a first indication of the first transmit frequency to the first non-terrestrial-network node; or
transmitting a second indication of the second transmit frequency to the second non-terrestrial-network node; or
transmitting a third indication, of at least one of a time window or a frequency window, for the UE to receive at least one of the first transmit signal or the second transmit signal; or
transmitting a fourth indication of a signal sequence for at least one of the first transmit signal or the second transmit signal; or
transmitting a measurement gap configuration for the UE to measure at least one of the first transmit signal or the second transmit signal.

Clause 9. The method of clause 1, wherein the UE location assessment indication is provided based on an output of an artificial intelligence algorithm that uses as inputs the second signal frequency difference and at least one of:
the first signal frequency difference; or
an indication of a received power of at least one of the first signal or the second signal; or
an indication of at least one channel state of at least one of a first channel between the first non-terrestrial-network node and the UE or a second channel between the second non-terrestrial-network node and the UE.

Clause 10. The method of clause 1, wherein the network entity and the first non-terrestrial-network node are both part of a single physical apparatus.

Clause 11. A network entity comprising:
a memory; and
a processor communicatively coupled to the memory and configured to:
receive a reported user-equipment (UE) location:
obtain a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and
provide a UE location assessment indication based on the first signal frequency difference and based on a second signal frequency difference, that is a second difference between an expected frequency of the first signal at the reported UE location and an expected frequency of the second signal at the reported UE location.

Clause 12. The network entity of clause 11, wherein the UE location assessment indication is a UE location verification failure indication and the processor is configured to provide the UE location verification failure indication based on the first signal frequency difference and the second signal frequency difference differing by more than a threshold.

Clause 13. The network entity of clause 11, wherein the processor is configured to at least one of:
determine, in response to the reported UE location being a trigger location, the second signal frequency difference; or
provide the UE location assessment indication in response to the reported UE location being the trigger location.

Clause 14. The network entity of clause 11, wherein the processor is configured to:
obtain an indication of a velocity of the UE;
determine the expected frequency of the first signal at the reported UE location based on the indication of the velocity of the UE; and
determine the expected frequency of the second signal at the reported UE location based on the indication of the velocity of the UE.

Clause 15. The network entity of clause 11, wherein the processor is configured to transmit a request for the UE to report motion of the UE, and to transmit the request based on anticipated motion of the UE being able to cause a Doppler shift of at least a threshold Doppler shift in at least one of the received frequency of the first signal received by the UE or the received frequency of the second signal received by the UE.

Clause 16. The network entity of clause 11, wherein the processor is configured to transmit an instruction for the second non-terrestrial-network node to transmit the second transmit signal.

Clause 17. The network entity of clause 16, wherein the processor is configured to select the second non-terrestrial-network node, from a plurality of potential network entities, based on the reported UE location.

Clause 18. The network entity of clause 11, wherein the processor is configured to, based on the reported UE location, at least one of:
transmit a first indication of the first transmit frequency; or
transmit a second indication of the second transmit frequency; or
transmit a third indication, of at least one of a time window or a frequency window, for the UE to receive at least one of the first transmit signal or the second transmit signal; or
transmit a fourth indication of a signal sequence for at least one of the first transmit signal or the second transmit signal; or transmit a measurement gap configuration for the UE to measure at least one of the first transmit signal or the second transmit signal.

Clause 19. The network entity of clause 11, wherein the processor, to provide the UE location assessment indication, is configured to implement an artificial intelligence algorithm that uses as inputs the second signal frequency difference and at least one of:
- the first signal frequency difference; or
- an indication of a received power of at least one of the first signal or the second signal; or
- an indication of at least one channel state of at least one of a first channel between the first non-terrestrial-network node and the UE or a second channel between the second non-terrestrial-network node and the UE.

Clause 20. The network entity of clause 11, wherein the network entity and the first non-terrestrial-network node are both part of a single physical apparatus.

Clause 21. A network entity comprising:
- means for receiving a reported user-equipment (UE) location;
- means for obtaining a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and
- means for providing a UE location assessment indication based on the first signal frequency difference and based on a second signal frequency difference, that is a second difference between an expected frequency of the first signal at the reported UE location and an expected frequency of the second signal at the reported UE location.

Clause 22. The network entity of clause 21, wherein the means for providing the UE location assessment indication comprise means for providing a UE location verification failure indication based on the first signal frequency difference and the second signal frequency difference differing by more than a threshold.

Clause 23. The network entity of clause 21, wherein at least one of:
- the network entity further comprises means for determining, in response to the reported UE location being a trigger location, the second signal frequency difference; or
- the means for providing the UE location assessment indication comprise means for providing the UE location assessment indication in response to the reported UE location being the trigger location.

Clause 24. The network entity of clause 21, further comprising:
- means for obtaining an indication of a velocity of the UE;
- means for determining the expected frequency of the first signal at the reported UE location based on the indication of the velocity of the UE; and
- means for determining the expected frequency of the second signal at the reported UE location based on the indication of the velocity of the UE.

Clause 25. The network entity of clause 21, further comprising means for transmitting a request for the UE to report motion of the UE, wherein the means for transmitting the request comprise means for transmitting the request based on anticipated motion of the UE being able to cause a Doppler shift of at least a threshold Doppler shift in at least one of the received frequency of the first signal received by the UE or the received frequency of the second signal received by the UE.

Clause 26. The network entity of clause 21, further comprising means for transmitting an instruction for the second non-terrestrial-network node to transmit the second transmit signal.

Clause 27. The network entity of clause 26, further comprising means for selecting the second non-terrestrial-network node, from a plurality of potential network entities, based on the reported UE location.

Clause 28. The network entity of clause 21, further comprising at least one of:
- means for transmitting, based on the reported UE location, a first indication of the first transmit frequency to the first non-terrestrial-network node; or
- means for transmitting, based on the reported UE location, a second indication of the second transmit frequency to the second non-terrestrial-network node; or
- means for transmitting, based on the reported UE location, a third indication, of at least one of a time window or a frequency window, for the UE to receive at least one of the first transmit signal or the second transmit signal; or
- means for transmitting a fourth indication of a signal sequence for at least one of the first transmit signal or the second transmit signal; or
- means for transmitting, based on the reported UE location, a measurement gap configuration for the UE to measure at least one of the first transmit signal or the second transmit signal.

Clause 29. The network entity of clause 21, wherein the means for providing the UE location assessment indication comprise means for providing the UE location assessment indication based on an output of an artificial intelligence algorithm that uses as inputs the second signal frequency difference and at least one of:
- the first signal frequency difference; or
- an indication of a received power of at least one of the first signal or the second signal; or
- an indication of at least one channel state of at least one of a first channel between the first non-terrestrial-network node and the UE or a second channel between the second non-terrestrial-network node and the UE.

Clause 30. The network entity of clause 21, wherein the network entity and the first non-terrestrial-network node are both part of a single physical apparatus.

Clause 31. A non-transitory, processor-readable storage medium comprising processor-readable instructions to cause one or more processors of a network entity to:
- receive a reported user-equipment (UE) location;
- obtain a first signal frequency difference indicating a first difference between a received frequency of a first signal received by the UE corresponding to a first transmit signal of a first transmit frequency transmitted from a first non-terrestrial-network node, and a received frequency of a second signal received by the UE corresponding to a second transmit signal of a second transmit frequency transmitted from a second non-terrestrial-network node that is separate from the first non-terrestrial-network node; and
- provide a UE location assessment indication based on the first signal frequency difference and based on a second signal frequency difference, that is a second difference between an expected frequency of the first signal at the reported UE location and an expected frequency of the second signal at the reported UE location.

Clause 32. The non-transitory, processor-readable storage medium of clause 31, wherein the processor-readable instructions to cause the one or more processors to provide the UE location assessment indication comprise processor-readable instructions to cause the one or more processors to provide a UE location verification failure indication based on the first signal frequency difference and the second signal frequency difference differing by more than a threshold.

Clause 33. The non-transitory, processor-readable storage medium of clause 31, wherein at least one of:
the non-transitory, processor-readable storage medium further comprises processor-readable instructions to cause the one or more processors to determine, in response to the reported UE location being a trigger location, the second signal frequency difference; or
the processor-readable instructions to cause the one or more processors to provide the UE location assessment indication comprise processor-readable instructions to cause the one or more processors to provide the UE location assessment indication in response to the reported UE location being the trigger location.

Clause 34. The non-transitory, processor-readable storage medium of clause 31, further comprising processor-readable instructions to cause the one or more processors to:
obtain an indication of a velocity of the UE:
determine the expected frequency of the first signal at the reported UE location based on the indication of the velocity of the UE; and
determine the expected frequency of the second signal at the reported UE location based on the indication of the velocity of the UE.

Clause 35. The non-transitory, processor-readable storage medium of clause 31, further comprising processor-readable instructions to cause the one or more processors to transmit a request for the UE to report motion of the UE, wherein the processor-readable instructions to cause the one or more processors to transmit the request comprise processor-readable instructions to cause the one or more processors to transmit the request based on anticipated motion of the UE being able to cause a Doppler shift of at least a threshold Doppler shift in at least one of the received frequency of the first signal received by the UE or the received frequency of the second signal received by the UE.

Clause 36. The non-transitory, processor-readable storage medium of clause 31, further comprising processor-readable instructions to cause the one or more processors to transmit an instruction for the second non-terrestrial-network node to transmit the second transmit signal.

Clause 37. The non-transitory, processor-readable storage medium of clause 36, further comprising processor-readable instructions to cause the one or more processors to select the second non-terrestrial-network node, from a plurality of potential network entities, based on the reported UE location.

Clause 38. The non-transitory, processor-readable storage medium of clause 31, further comprising at least one of:
processor-readable instructions to cause the one or more processors to transmit, based on the reported UE location, a first indication of the first transmit frequency to the first non-terrestrial-network node; or
processor-readable instructions to cause the one or more processors to transmit, based on the reported UE location, a second indication of the second transmit frequency to the second non-terrestrial-network node; or
processor-readable instructions to cause the one or more processors to transmit, based on the reported UE location, a third indication, of at least one of a time window or a frequency window, for the UE to receive at least one of the first transmit signal or the second transmit signal; or
processor-readable instructions to cause the one or more processors to transmit a fourth indication of a signal sequence for at least one of the first transmit signal or the second transmit signal; or
processor-readable instructions to cause the one or more processors to transmit, based on the reported UE location, a measurement gap configuration for the UE to measure at least one of the first transmit signal or the second transmit signal.

Clause 39. The non-transitory, processor-readable storage medium of clause 31, wherein the processor-readable instructions to cause the one or more processors to provide the UE location assessment indication comprise processor-readable instructions to cause the one or more processors to provide the UE location assessment indication based on an output of an artificial intelligence algorithm that uses as inputs the second signal frequency difference and at least one of:
the first signal frequency difference; or
an indication of a received power of at least one of the first signal or the second signal; or
an indication of at least one channel state of at least one of a first channel between the first non-terrestrial-network node and the UE or a second channel between the second non-terrestrial-network node and the UE.

Clause 40. A UE (user equipment) comprising:
a memory;
a transceiver; and
a processor communicatively coupled to the memory and the transceiver and configured to:
receive, via the transceiver, a first received signal having a first received signal frequency and corresponding to a first transmit signal of a first transmit frequency transmitted from a first non-terrestrial-network node;
receive, via the transceiver, a second received signal having a second received signal frequency and corresponding to a second transmit signal of a second transmit frequency transmitted from a second non-terrestrial-network node that is separate from the first non-terrestrial-network node; and
transmit, via the transceiver to a network entity, a signal frequency difference indicating a difference between the first received signal frequency and the second received signal frequency.

Clause 41. The UE of clause 40, wherein the processor is configured to transmit, via the transceiver to the network entity, an indication of a location of the UE corresponding to the signal frequency difference.

Clause 42. The UE of clause 40, wherein the processor is configured to receive, via the transceiver from the network entity, configuration information for receiving at least one of the first received signal or the second received signal, wherein the processor is configured to receive the first received signal and the second received signal based on the configuration information.

Clause 43. A method of reporting received-signal frequency difference, the method comprising:
receiving, at a UE (user equipment), a first received signal having a first received signal frequency and corresponding to a first transmit signal of a first transmit frequency transmitted from a first non-terrestrial-network node;
receiving, at the UE, a second received signal having a second received signal frequency and corresponding to a second transmit signal of a second transmit frequency transmitted from a second non-terrestrial-network node that is separate from the first non-terrestrial-network node; and
transmitting, from the UE to a network entity, a signal frequency difference indicating a difference between the first received signal frequency and the second received signal frequency.

Clause 44. The method of reporting received-signal frequency difference of clause 43, further comprising transmitting, to the network entity, an indication of a location of the UE corresponding to the signal frequency difference.

Clause 45. The method of reporting received-signal frequency difference of clause 43, further comprising receiving, from the network entity, configuration information for receiving at least one of the first received signal or the second received signal, wherein receiving the first received signal and the second received signal are based on the configuration information.

Clause 46. A UE (user equipment) comprising:
means for receiving a first received signal having a first received signal frequency and corresponding to a first transmit signal of a first transmit frequency transmitted from a first non-terrestrial-network node;
means for receiving a second received signal having a second received signal frequency and corresponding to a second transmit signal of a second transmit frequency transmitted from a second non-terrestrial-network node that is separate from the first non-terrestrial-network node; and
means for transmitting, to a network entity, a signal frequency difference indicating a difference between the first received signal frequency and the second received signal frequency.

Clause 47. The UE of clause 46, further comprising means for transmitting, to the network entity, an indication of a location of the UE corresponding to the signal frequency difference.

Clause 48. The UE of clause 46, further comprising means for receiving, from the network entity, configuration information for receiving at least one of the first received signal or the second received signal, wherein the means for receiving the first received signal and the second received signal comprise means for receiving the first received signal and the second received signal based on the configuration information.

Clause 49. A non-transitory, processor-readable storage medium comprising processor-readable instructions to cause one or more processors of a UE (user equipment) to:
receive a first received signal having a first received signal frequency and corresponding to a first transmit signal of a first transmit frequency transmitted from a first non-terrestrial-network node;
receive a second received signal having a second received signal frequency and corresponding to a second transmit signal of a second transmit frequency transmitted from a second non-terrestrial-network node that is separate from the first non-terrestrial-network node; and
transmit, to a network entity, a signal frequency difference indicating a difference between the first received signal frequency and the second received signal frequency.

Clause 50. The UE of clause 49, further comprising processor-readable instructions to cause the one or more processors of the UE to transmit, to the network entity, an indication of a location of the UE corresponding to the signal frequency difference.

Clause 51. The UE of clause 49, further comprising processor-readable instructions to cause the one or more processors of the UE to receive, from the network entity, configuration information for receiving at least one of the first received signal or the second received signal, wherein the processor-readable instructions to cause the one or more processors of the UE to receive the first received signal and the second received signal comprise processor-readable instructions to cause the one or more processors of the UE to receive the first received signal and the second received signal based on the configuration information.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes." and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B. or C." or a list of "one or more of A. B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A. or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device." or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, 5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method of assessing a reported user-equipment (UE) location, the method comprising:
   receiving, at a network entity, the reported UE location;
   obtaining, at the network entity, a first signal frequency difference indicating a first difference between a first received frequency of a first signal and a second received frequency of a second signal, the first signal received by the UE and corresponding to a first transmit signal of a first transmit frequency transmitted from a first non-terrestrial-network node, and the second signal received by the UE and corresponding to a second transmit signal of a second transmit frequency transmitted from a second non-terrestrial-network node that is separate from the first non-terrestrial-network node; and
   providing, by the network entity, a UE location assessment indication based on the first signal frequency difference and a second signal frequency difference, wherein the second signal frequency difference is a second difference between an expected frequency of the first signal at the reported UE location and an expected frequency of the second signal at the reported UE location.

2. The method of claim 1, wherein the UE location assessment indication is a UE location verification failure indication and is provided based on the first signal frequency difference and the second signal frequency difference differing by more than a threshold.

3. The method of claim 1, wherein at least one of:
the method comprises determining, in response to the reported UE location being a trigger location, the second signal frequency difference; or
providing the UE location assessment indication is performed in response to the reported UE location being the trigger location.

4. The method of claim 1, further comprising:
obtaining, at the network entity, an indication of a velocity of the UE;
determining, at the network entity, the expected frequency of the first signal at the reported UE location based on the indication of the velocity of the UE; and
determining, at the network entity, the expected frequency of the second signal at the reported UE location based on the indication of the velocity of the UE.

5. The method of claim 1, further comprising transmitting, from the network entity, a request for the UE to report motion of the UE, wherein the request is transmitted based on anticipated motion of the UE being able to cause a Doppler shift of at least a threshold Doppler shift in at least one of the first received frequency of the first signal received by the UE or the second received frequency of the second signal received by the UE.

6. The method of claim 1, further comprising transmitting, from the network entity, an instruction for the second non-terrestrial-network node to transmit the second transmit signal.

7. The method of claim 6, wherein the network entity selects the second non-terrestrial-network node, from a plurality of potential network entities, based on the reported UE location.

8. The method of claim 1, further comprising, at the network entity and based on the reported UE location, at least one of:
transmitting a first indication of the first transmit frequency to the first non-terrestrial-network node; or
transmitting a second indication of the second transmit frequency to the second non-terrestrial-network node; or
transmitting a third indication, of at least one of a time window or a frequency window, for the UE to receive at least one of the first transmit signal or the second transmit signal; or
transmitting a fourth indication of a signal sequence for at least one of the first transmit signal or the second transmit signal; or
transmitting a measurement gap configuration for the UE to measure at least one of the first transmit signal or the second transmit signal.

9. The method of claim 1, wherein the UE location assessment indication is provided based on an output of an artificial intelligence algorithm that uses as inputs the second signal frequency difference and at least one of:
the first signal frequency difference; or
an indication of a received power of at least one of the first signal or the second signal; or
an indication of at least one channel state of at least one of a first channel between the first non-terrestrial-network node and the UE or a second channel between the second non-terrestrial-network node and the UE.

10. The method of claim 1, wherein the network entity and the first non-terrestrial-network node are both part of a single physical apparatus.

11. A network entity comprising:
a memory; and
a processor communicatively coupled to the memory and configured to:
receive a reported user-equipment (UE) location;
obtain a first signal frequency difference indicating a first difference between a first received frequency of a first signal and a second received frequency of a second signal, the first signal received by the UE and corresponding to a first transmit signal of a first transmit frequency transmitted from a first non-terrestrial-network node, and the second signal received by the UE and corresponding to a second transmit signal of a second transmit frequency transmitted from a second non-terrestrial-network node that is separate from the first non-terrestrial-network node; and
provide a UE location assessment indication based on the first signal frequency difference and based on a second signal frequency difference, that is a second difference between an expected frequency of the first signal at the reported UE location and an expected frequency of the second signal at the reported UE location.

12. The network entity of claim 11, wherein the UE location assessment indication is a UE location verification failure indication and the processor is configured to provide the UE location verification failure indication based on the first signal frequency difference and the second signal frequency difference differing by more than a threshold.

13. The network entity of claim 11, wherein the processor is configured to at least one of:
determine, in response to the reported UE location being a trigger location, the second signal frequency difference; or
provide the UE location assessment indication in response to the reported UE location being the trigger location.

14. The network entity of claim 11, wherein the processor is configured to:
obtain an indication of a velocity of the UE;
determine the expected frequency of the first signal at the reported UE location based on the indication of the velocity of the UE; and
determine the expected frequency of the second signal at the reported UE location based on the indication of the velocity of the UE.

15. The network entity of claim 11, wherein the processor is configured to transmit a request for the UE to report motion of the UE, and to transmit the request based on anticipated motion of the UE being able to cause a Doppler shift of at least a threshold Doppler shift in at least one of the first received frequency of the first signal received by the UE or the second received frequency of the second signal received by the UE.

16. The network entity of claim 11, wherein the processor is configured to transmit an instruction for the second non-terrestrial-network node to transmit the second transmit signal.

17. The network entity of claim 16, wherein the processor is configured to select the second non-terrestrial-network node, from a plurality of potential network entities, based on the reported UE location.

18. The network entity of claim 11, wherein the processor is configured to, based on the reported UE location, at least one of:
  transmit a first indication of the first transmit frequency; or
  transmit a second indication of the second transmit frequency; or
  transmit a third indication, of at least one of a time window or a frequency window, for the UE to receive at least one of the first transmit signal or the second transmit signal; or
  transmit a fourth indication of a signal sequence for at least one of the first transmit signal or the second transmit signal; or
  transmit a measurement gap configuration for the UE to measure at least one of the first transmit signal or the second transmit signal.

19. The network entity of claim 11, wherein the processor, to provide the UE location assessment indication, is configured to implement an artificial intelligence algorithm that uses as inputs the second signal frequency difference and at least one of:
  the first signal frequency difference; or
  an indication of a received power of at least one of the first signal or the second signal; or
  an indication of at least one channel state of at least one of a first channel between the first non-terrestrial-network node and the UE or a second channel between the second non-terrestrial-network node and the UE.

20. The network entity of claim 11, wherein the network entity and the first non-terrestrial-network node are both part of a single physical apparatus.

21. A network entity comprising:
  means for receiving a reported user-equipment (UE) location;
  means for obtaining a first signal frequency difference indicating a first difference between a first received frequency of a first signal and a second received frequency of a second signal, the first signal received by the UE corresponding to a first transmit signal of a first transmit frequency transmitted from a first non-terrestrial-network node, and the second signal received by the UE and corresponding to a second transmit signal of a second transmit frequency transmitted from a second non-terrestrial-network node that is separate from the first non-terrestrial-network node; and
  means for providing a UE location assessment indication based on the first signal frequency difference and based on a second signal frequency difference, that is a second difference between an expected frequency of the first signal at the reported UE location and an expected frequency of the second signal at the reported UE location.

22. The network entity of claim 21, wherein the means for providing the UE location assessment indication comprise means for providing a UE location verification failure indication based on the first signal frequency difference and the second signal frequency difference differing by more than a threshold.

23. The network entity of claim 21, wherein at least one of:
  the network entity further comprises means for determining, in response to the reported UE location being a trigger location, the second signal frequency difference; or
  the means for providing the UE location assessment indication comprise means for providing the UE location assessment indication in response to the reported UE location being the trigger location.

24. The network entity of claim 21, further comprising:
  means for obtaining an indication of a velocity of the UE;
  means for determining the expected frequency of the first signal at the reported UE location based on the indication of the velocity of the UE; and
  means for determining the expected frequency of the second signal at the reported UE location based on the indication of the velocity of the UE.

25. The network entity of claim 21, further comprising means for transmitting a request for the UE to report motion of the UE, wherein the means for transmitting the request comprise means for transmitting the request based on anticipated motion of the UE being able to cause a Doppler shift of at least a threshold Doppler shift in at least one of the first received frequency of the first signal received by the UE or the second received frequency of the second signal received by the UE.

26. The network entity of claim 21, further comprising means for transmitting an instruction for the second non-terrestrial-network node to transmit the second transmit signal.

27. The network entity of claim 26, further comprising means for selecting the second non-terrestrial-network node, from a plurality of potential network entities, based on the reported UE location.

28. The network entity of claim 21, further comprising at least one of:
  means for transmitting, based on the reported UE location, a first indication of the first transmit frequency to the first non-terrestrial-network node; or
  means for transmitting, based on the reported UE location, a second indication of the second transmit frequency to the second non-terrestrial-network node; or
  means for transmitting, based on the reported UE location, a third indication, of at least one of a time window or a frequency window, for the UE to receive at least one of the first transmit signal or the second transmit signal; or
  means for transmitting a fourth indication of a signal sequence for at least one of the first transmit signal or the second transmit signal; or
  means for transmitting, based on the reported UE location, a measurement gap configuration for the UE to measure at least one of the first transmit signal or the second transmit signal.

29. The network entity of claim 21, wherein the means for providing the UE location assessment indication comprise means for providing the UE location assessment indication based on an output of an artificial intelligence algorithm that uses as inputs the second signal frequency difference and at least one of:
  the first signal frequency difference; or
  an indication of a received power of at least one of the first signal or the second signal; or
  an indication of at least one channel state of at least one of a first channel between the first non-terrestrial-network node and the UE or a second channel between the second non-terrestrial-network node and the UE.

30. A non-transitory, processor-readable storage medium comprising processor-readable instructions to cause one or more processors of a network entity to:
  receive a reported user-equipment (UE) location;

obtain a first signal frequency difference indicating a first difference between a first received frequency of a first signal and a second received frequency of a second signal, the first signal received by the UE corresponding to a first transmit signal of a first transmit frequency transmitted from a first non-terrestrial-network node, and the second signal received by the UE corresponding to a second transmit signal of a second transmit frequency transmitted from a second non-terrestrial-network node that is separate from the first non-terrestrial-network node; and provide a UE location assessment indication based on the first signal frequency difference and based on a second signal frequency difference, that is a second difference between an expected frequency of the first signal at the reported UE location and an expected frequency of the second signal at the reported UE location.

\* \* \* \* \*